United States Patent
Beall et al.

(10) Patent No.: US 11,654,592 B2
(45) Date of Patent: May 23, 2023

(54) RECTANGULAR OUTLET HONEYCOMB STRUCTURES, PARTICULATE FILTERS, EXTRUSION DIES, AND METHOD OF MANUFACTURE THEREOF

(71) Applicant: CORNING INCORPORATED, Corning, NY (US)

(72) Inventors: Douglas Munroe Beall, Painted Post, NY (US); Suhao He, Ithaca, NY (US); Achim Karl-Erich Heibel, Corning, NY (US); Kenneth Richard Miller, Addison, NY (US); Pushkar Tandon, Painted Post, NY (US); David John Thompson, Savona, NY (US)

(73) Assignee: Corning Incorporated, Corning, NY (US)

( * ) Notice: Subject to any disclaimer, the term of this patent is extended or adjusted under 35 U.S.C. 154(b) by 64 days.

(21) Appl. No.: 17/481,830

(22) Filed: Sep. 22, 2021

(65) Prior Publication Data
US 2022/0008858 A1    Jan. 13, 2022

Related U.S. Application Data

(63) Continuation of application No. 16/095,596, filed as application No. PCT/US2017/029159 on Apr. 24, 2017, now Pat. No. 11,148,089.
(Continued)

(51) Int. Cl.
*B01D 46/24* (2006.01)
*B28B 3/26* (2006.01)
*F01N 3/022* (2006.01)

(52) U.S. Cl.
CPC ............ *B28B 3/269* (2013.01); *B01D 46/247* (2013.01); *B01D 46/249* (2021.08);
(Continued)

(58) Field of Classification Search
CPC .............. B01D 46/247; B01D 46/2482; B01D 46/2484; B01D 46/2486; B01D 46/249;
(Continued)

(56) References Cited

U.S. PATENT DOCUMENTS 3,499,269 A   3/1970   Bois
4,417,908 A   11/1983  Pitcher, Jr.
(Continued)

FOREIGN PATENT DOCUMENTS

CN   101386214 A   3/2009
CN   102470310 A   5/2012
(Continued)

OTHER PUBLICATIONS

Japanese Patent Application No. 2022-017090, Office Action, dated Jan. 4, 2023, 7 pages (3 pages of English Translation and 4 pages of Original Copy); Japanese Patent Office.
(Continued)

*Primary Examiner* — Frank M Lawrence, Jr.
(74) *Attorney, Agent, or Firm* — Joseph M. Homa

(57) ABSTRACT

A particulate filter having a honeycomb structure of a matrix of interconnected porous walls including inlet cells and outlet cells defining a plurality of inlet channels and outlet channels, respectively, wherein at least a portion of the outlet cells are larger than any of the inlet cells, and a cross-sectional shape of at least some of the outlet channels is rectangular. Honeycomb extrusion dies, honeycomb bodies, honeycomb structures, and methods of manufacture are described, as are other aspects.

16 Claims, 21 Drawing Sheets

Related U.S. Application Data

(60) Provisional application No. 62/452,765, filed on Jan. 31, 2017, provisional application No. 62/326,384, filed on Apr. 22, 2016.

(52) U.S. Cl.
CPC ..... *B01D 46/2482* (2021.08); *B01D 46/2484* (2021.08); *B01D 46/2486* (2021.08); *F01N 3/0222* (2013.01); *F01N 2330/34* (2013.01); *Y02T 10/12* (2013.01)

(58) Field of Classification Search
CPC ............ B01D 46/2418; B01D 46/2451; B28B 3/269; F01N 3/0222; F01N 2330/34; Y02T 10/20
USPC ............................................ 55/523; 428/116
See application file for complete search history.

(56) References Cited

U.S. PATENT DOCUMENTS

| | | | |
|---|---|---|---|
| 4,420,316 | A | 12/1983 | Frost et al. |
| 4,464,185 | A | 8/1984 | Tomita et al. |
| 4,718,926 | A | 1/1988 | Nakamoto et al. |
| 6,790,248 | B2 | 9/2004 | Ishihara et al. |
| 8,057,766 | B2 | 11/2011 | Ogyu et al. |
| 2002/0174770 | A1 | 11/2002 | Badeau et al. |
| 2004/0037754 | A1 | 2/2004 | Van Setten et al. |
| 2004/0170803 | A1 | 9/2004 | Ichikawa |
| 2005/0066639 | A1 | 3/2005 | Frost |
| 2005/0166562 | A1 | 8/2005 | Beall et al. |
| 2005/0191461 | A1 | 9/2005 | Kasai et al. |
| 2006/0159602 | A1 | 7/2006 | Ohno et al. |
| 2008/0124517 | A1 | 5/2008 | Beall et al. |
| 2008/0247918 | A1 | 10/2008 | Ohno et al. |
| 2008/0261806 | A1 | 10/2008 | Konstandopoulos et al. |
| 2009/0056546 | A1 | 3/2009 | Bazyn et al. |
| 2009/0139193 | A1 | 6/2009 | Garcia et al. |
| 2009/0241495 | A1 | 10/2009 | Yamada et al. |
| 2011/0085953 | A1 | 4/2011 | Ogyu et al. |
| 2015/0009627 | A1 | 1/2015 | O'Connor et al. |
| 2015/0072104 | A1 | 3/2015 | Iwasaki et al. |
| 2015/0096274 | A1 | 4/2015 | Shibata et al. |
| 2016/0067653 | A1 | 3/2016 | Miyairi et al. |
| 2017/0197167 | A1 | 7/2017 | Shibata et al. |

FOREIGN PATENT DOCUMENTS

| | | |
|---|---|---|
| DE | 102008042372 A1 | 4/2009 |
| EP | 1219794 A1 | 7/2002 |
| EP | 2312133 A1 | 4/2011 |
| EP | 3173137 A1 | 5/2017 |
| FR | 2893668 A1 | 5/2007 |
| GB | 1213206 A | 11/1970 |
| JP | 58-196820 A | 11/1983 |
| JP | 07-229417 A | 8/1995 |
| JP | 09-313843 A | 12/1997 |
| JP | 2003-205245 A | 7/2003 |
| JP | 2004-084666 A | 3/2004 |
| JP | 2005-146975 A | 6/2005 |
| JP | 2010-053697 A | 3/2010 |
| JP | 2011-098335 A | 5/2011 |
| JP | 2015-175359 A | 10/2015 |
| WO | 2016/013511 A1 | 1/2016 |

OTHER PUBLICATIONS

European Patent Application No. 17722936.6 Office Action dated Jul. 20, 2022; 11 Pages; European Patent Office.
Chinese Patent Application No. 201780037389.9, Office Action dated May 31, 2021; 4 pages (English Translation Only); Chinese Patent Office.
International Invitation to Pay Additional Fees of the International Searching Authority; PCT/US2017/029159; dated Aug. 28, 2017; 12 Pages; European Patent Office.
International Search Report and Written Opinion of the International Searching Authority; PCT/US2017/029159; dated Nov. 15, 2017; 19 Pages; European Patent Office.
Japanese Patent Application No. 2018-555212 Notice of Reasons for Refusal dated Dec. 2, 2020; 8 Pages; (4 pages of English Translation and 4 pages of Original Document) Japanese Patent Office.

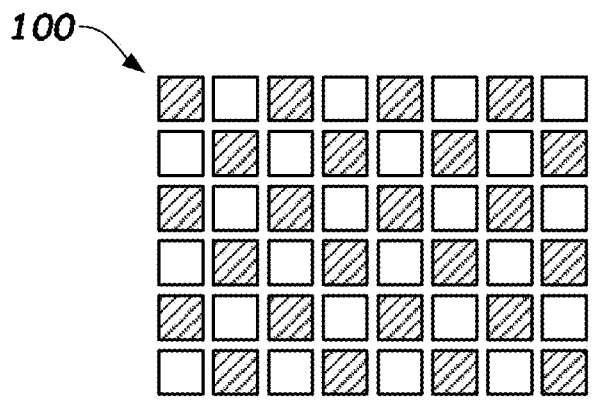
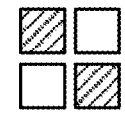
FIG. 1A
"Prior Art"
FIG. 1B
"Prior Art"
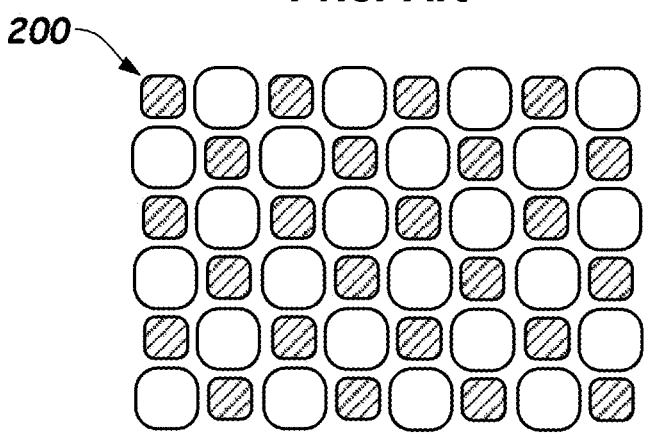
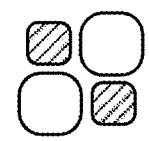
FIG. 2A
"Prior Art"
FIG. 2B
"Prior Art"
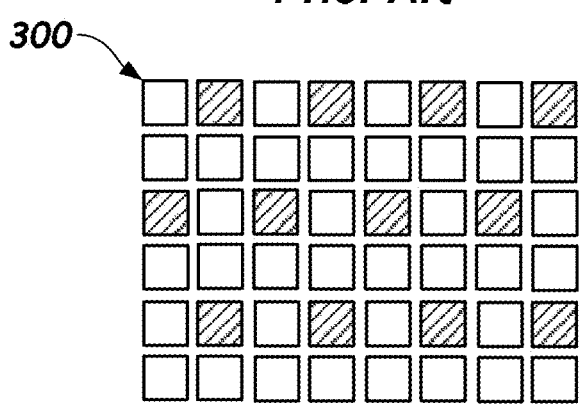
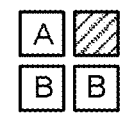
FIG. 3A
"Prior Art"
FIG. 3B
"Prior Art"

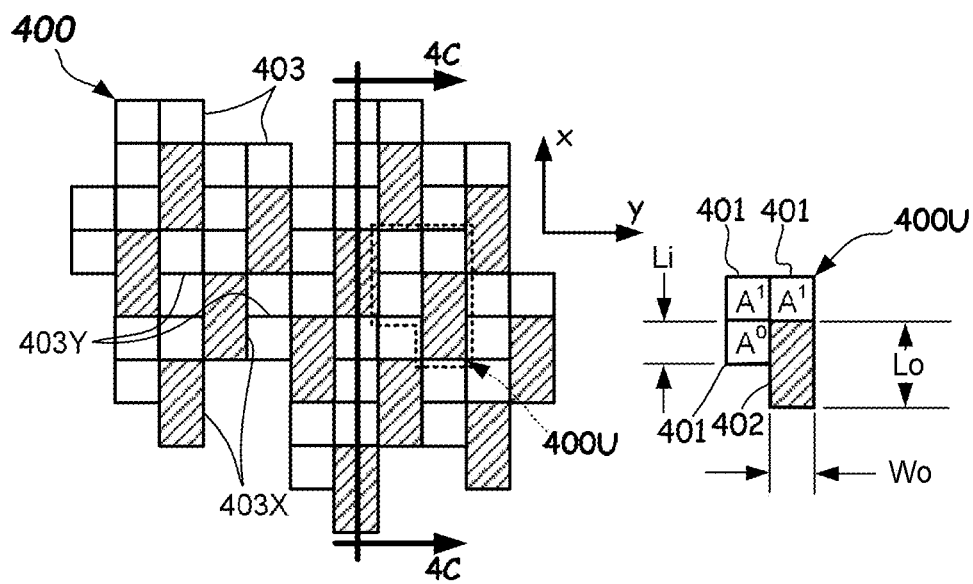
FIG. 4A  FIG. 4B
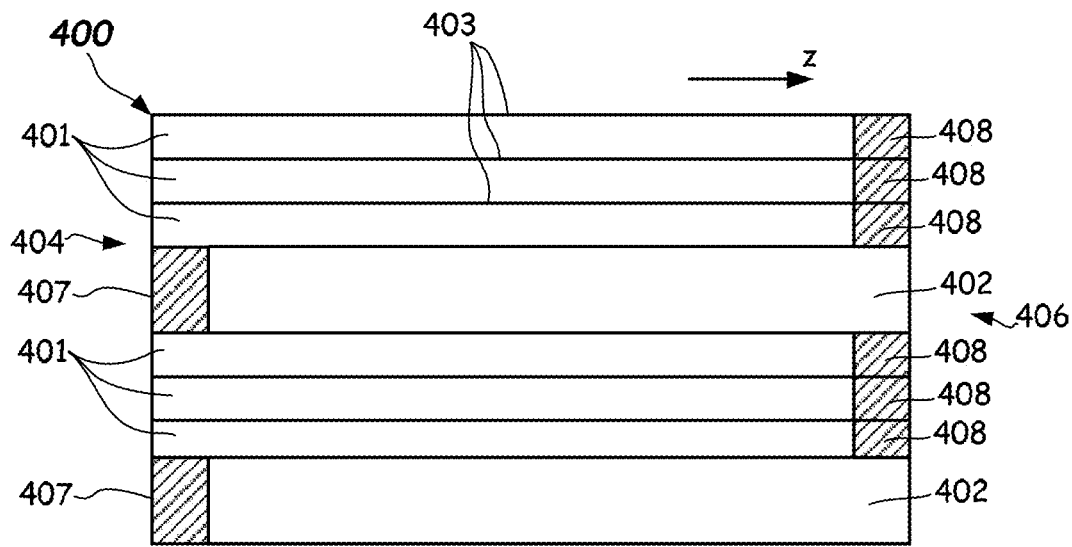
FIG. 4C

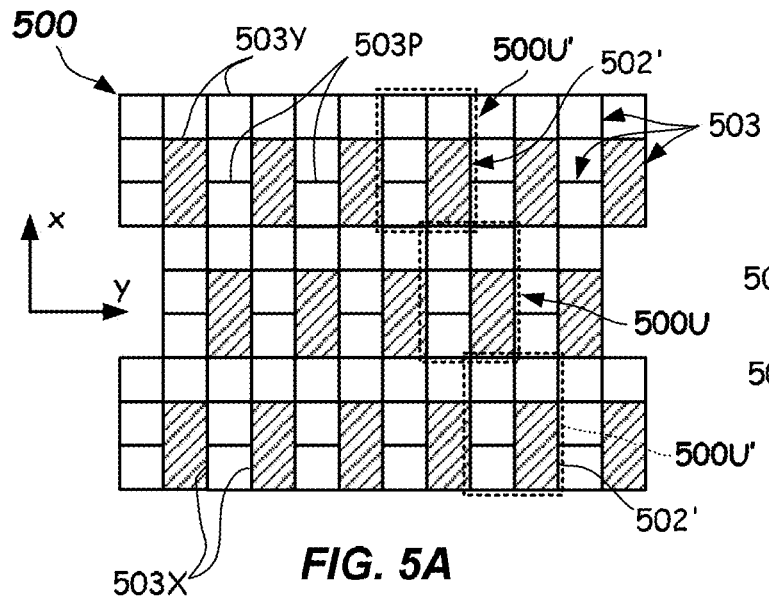
FIG. 5A
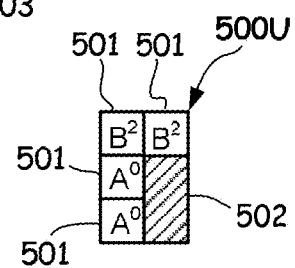
FIG. 5B
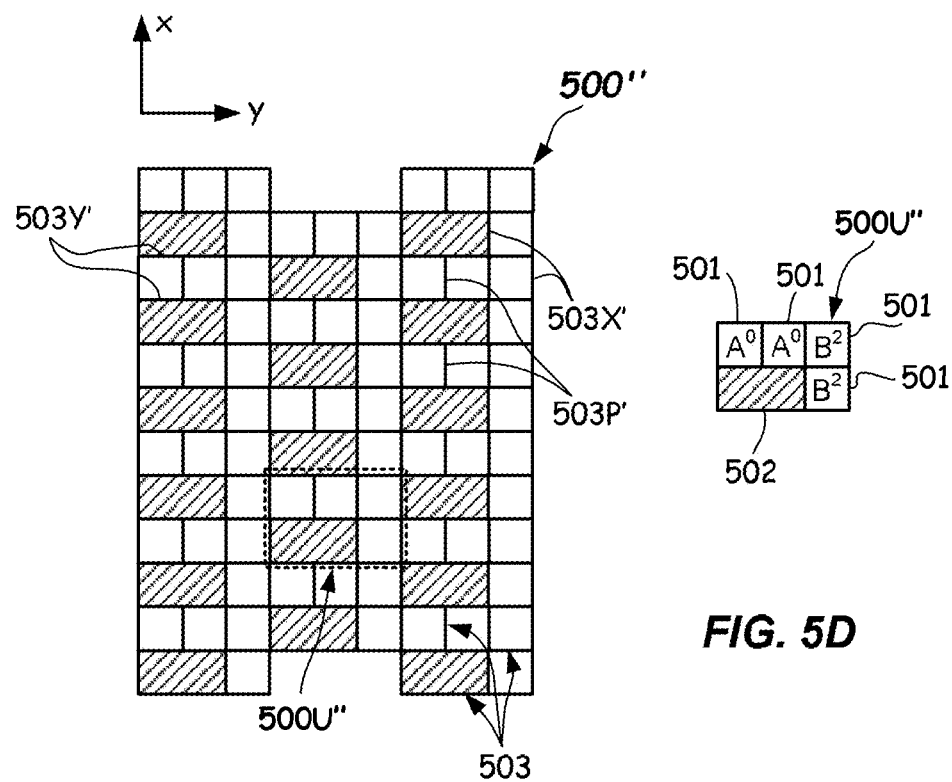
FIG. 5C
FIG. 5D

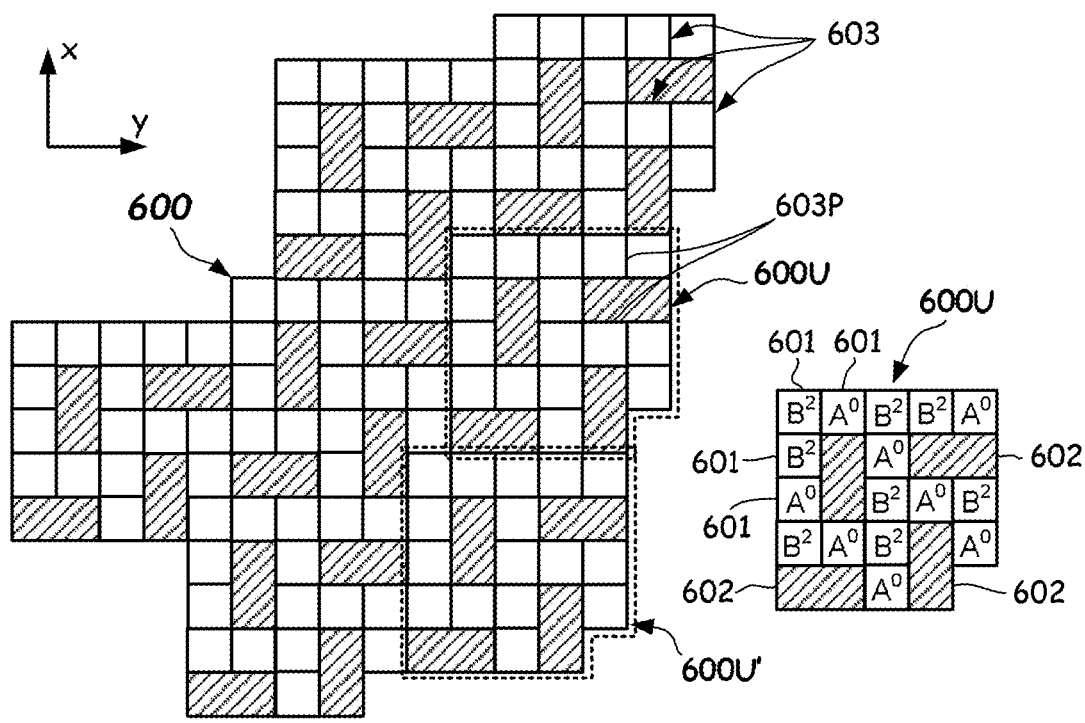
FIG. 6A  FIG. 6B
FIG. 6C  FIG. 6D
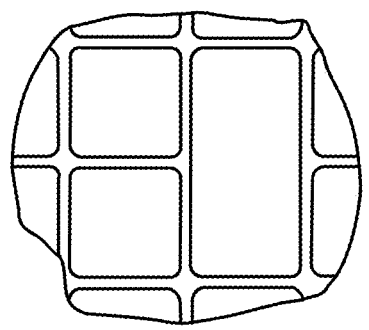
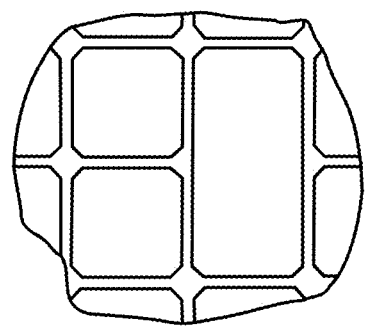

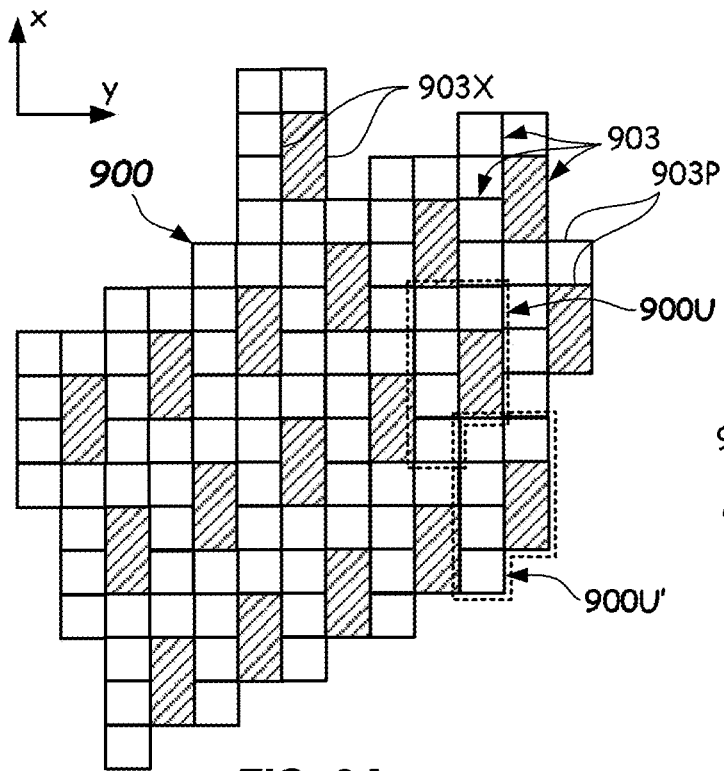
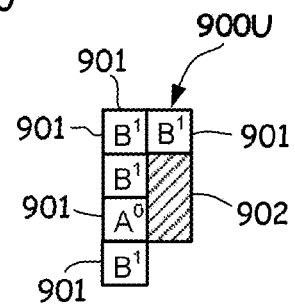
FIG. 9A
FIG. 9B
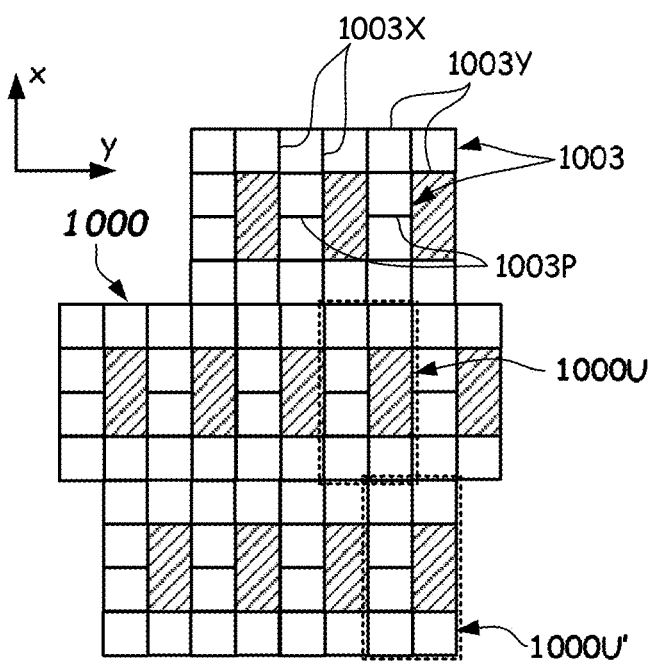
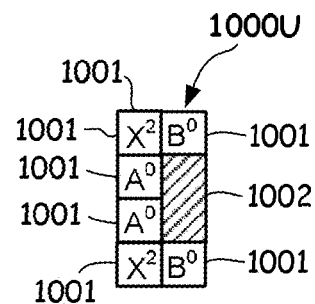
FIG. 10A
FIG. 10B

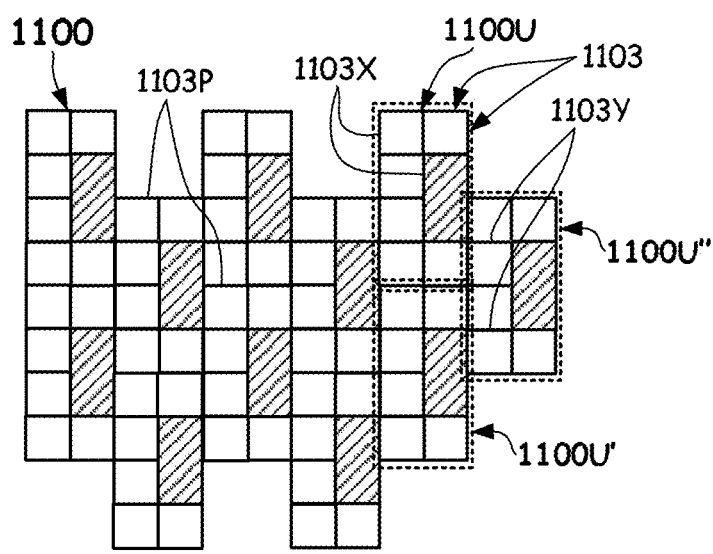
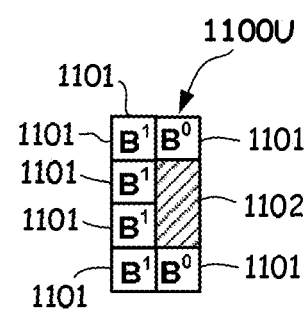
FIG. 11A  FIG. 11B
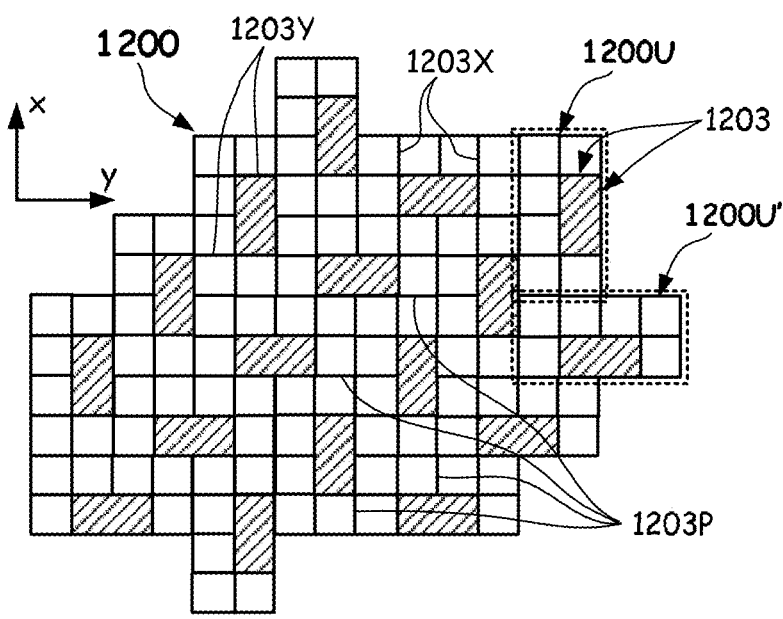
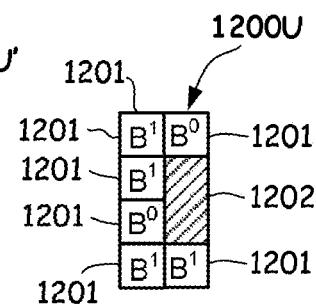
FIG. 12A  FIG. 12B

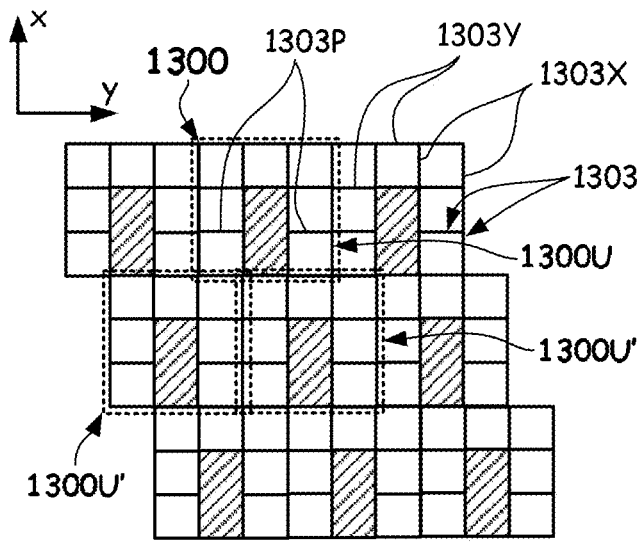 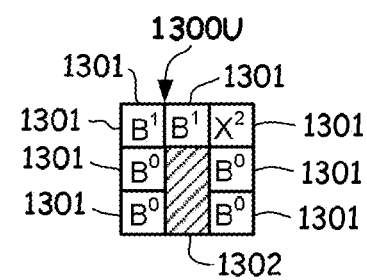
FIG. 13A  FIG. 13B
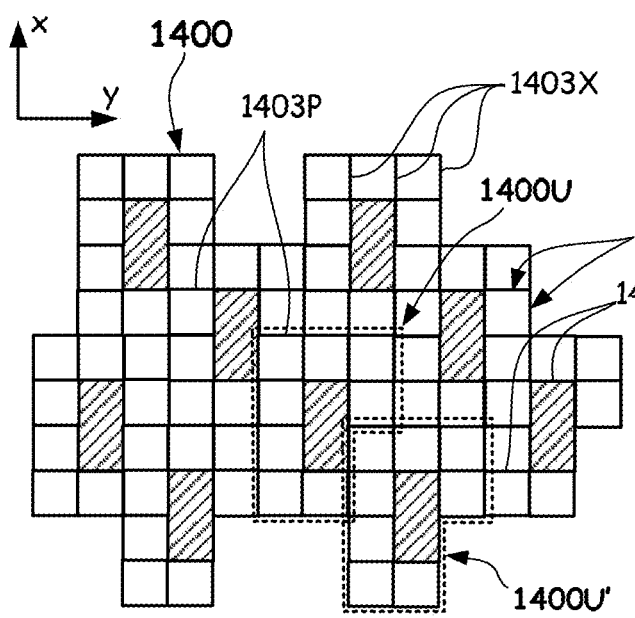 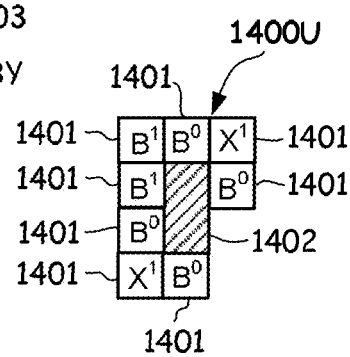
FIG. 14A  FIG. 14B

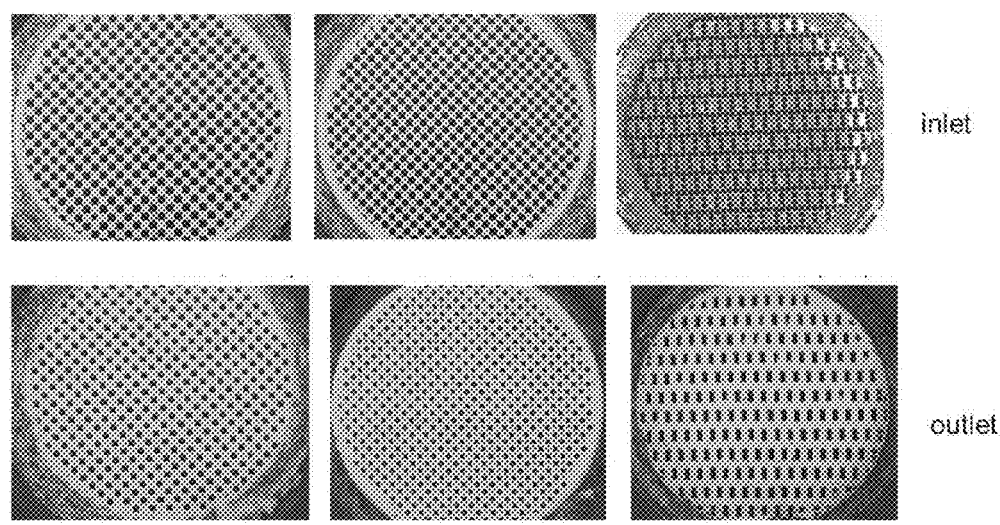
FIG. 17A   FIG. 17B   FIG. 17C
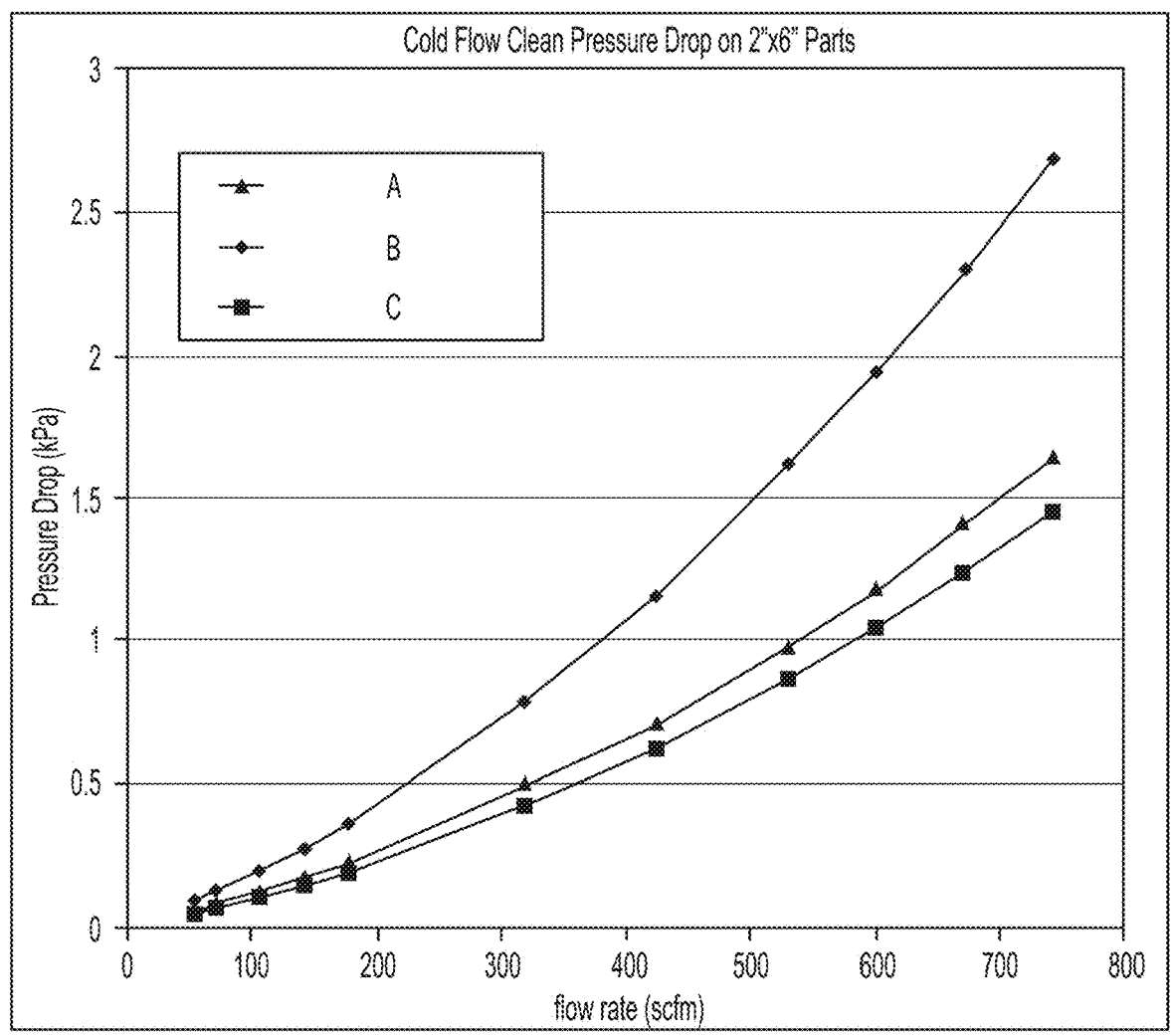
FIG. 18A

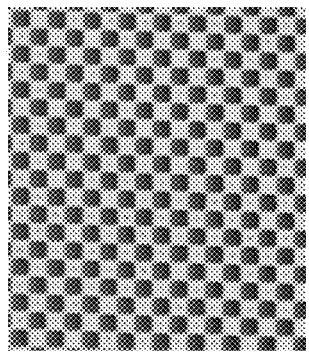
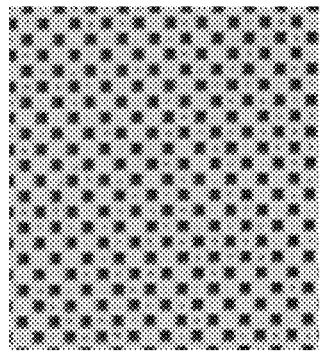
*inlet*     *outlet*
FIG. 19A
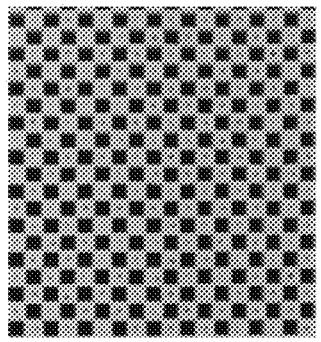
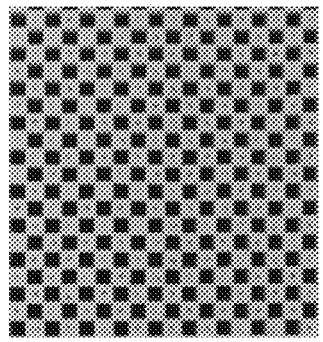
*inlet*     *outlet*
FIG. 19B

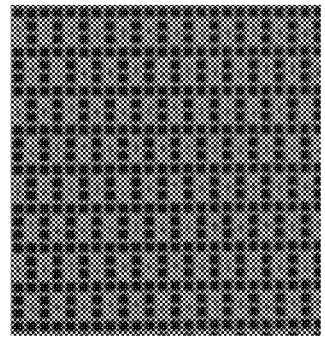
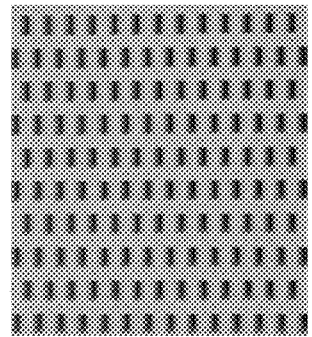
inlet    outlet    *FIG. 19D*
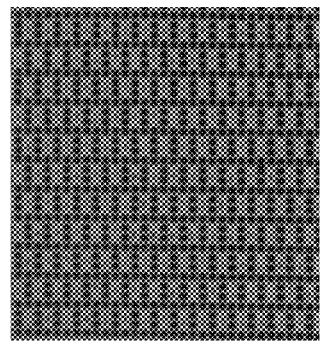
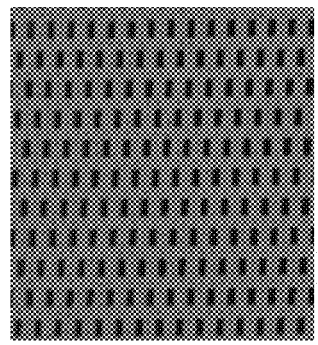
inlet    outlet    *FIG. 19C*

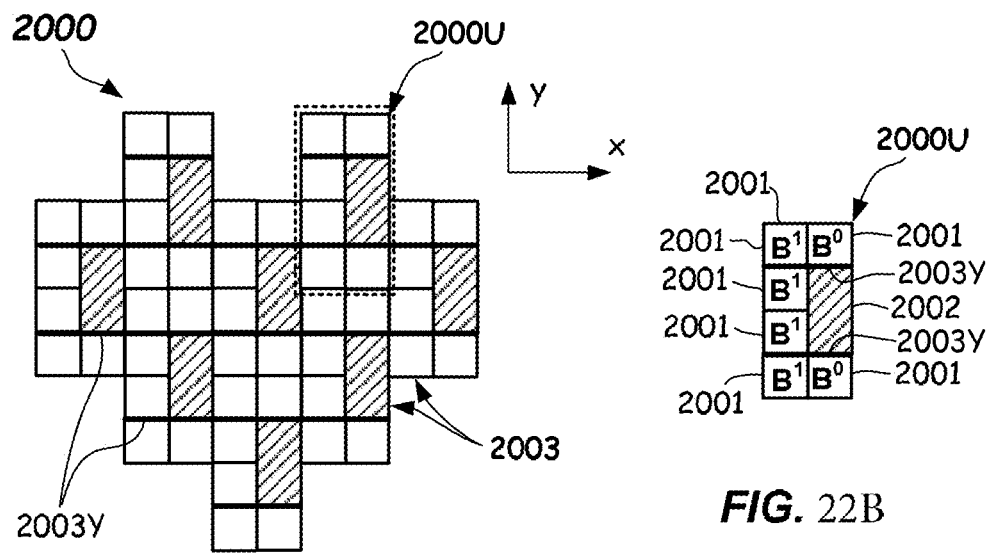
FIG. 22A
FIG. 22B
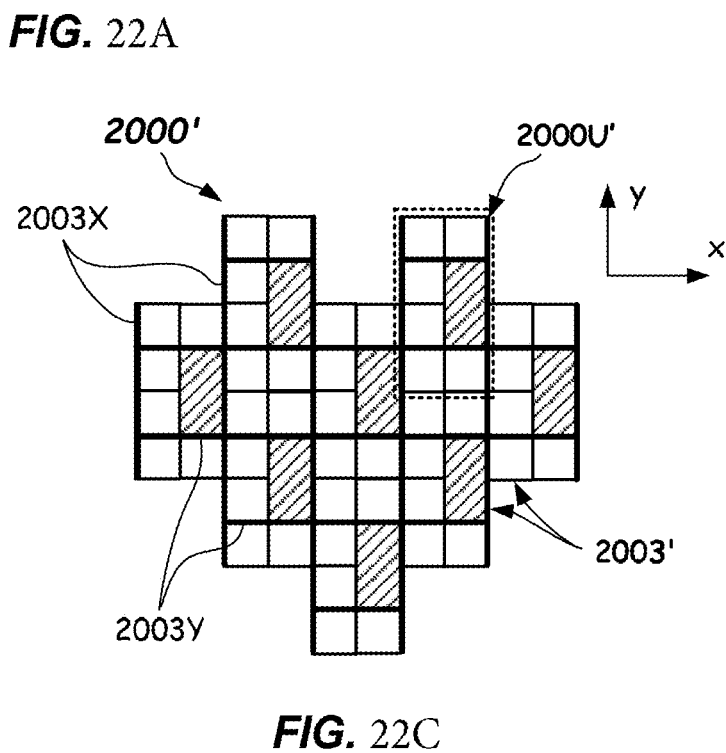
FIG. 22C

RECTANGULAR OUTLET HONEYCOMB STRUCTURES, PARTICULATE FILTERS, EXTRUSION DIES, AND METHOD OF MANUFACTURE THEREOF

CROSS-REFERENCE TO RELATED APPLICATIONS

This application is a Continuation of U.S. application Ser. No. 16/095,596 filed on Oct. 22, 2018, which claims the benefit of International Application No. PCT/US2017/029159, filed on Apr. 24, 2017, which claims the benefit of priority of U.S. Provisional Application Ser. No. 62/326,384 filed on Apr. 22, 2016 and U.S. Provisional Application Ser. No. 62/452,765 filed on Jan. 31, 2017, the contents of which are relied upon and incorporated herein by reference in their entireties.

FIELD

The present specification relates to particulate filters, such as filters comprising a plugged honeycomb structure, and honeycomb structures comprised of porous ceramic walls, such as used in filtering particles from a fluid stream such as from an engine exhaust stream.

BACKGROUND

Filters, such as plugged porous ceramic honeycomb filters, for example diesel particulate filters (DPFs), have been employed in exhaust after-treatment systems.

SUMMARY

The present disclosure relates to bodies comprising honeycomb structures, or honeycomb structure bodies or honeycomb bodies, which can comprise plugs such that the honeycomb bodies are particulate filters, such as filters comprising a plugged honeycomb structure, or a plugged honeycomb structure body, comprising a honeycomb structure comprised of porous ceramic walls, such as those used in filtering particles from a fluid stream such as an engine exhaust stream. The honeycomb structure of the honeycomb structure body comprises a matrix of cells comprised of porous walls disposed in relationship to each other, in which a plurality of subsets of cells can be identified, wherein the walls of the cells define channels and which can be, or are, plugged according to a selected plugging pattern, wherein a select subset, or subsets, of cells are referred to herein as repeating structural units (otherwise referred to herein as repeat blocks, repeat units, or unit blocks). Cell walls may serve as a shared boundary wall for two or more cells. Cell walls and plugs define cell channels, i.e. inlet and outlet channels, and a repeating structural units can be characterized as comprising a repeating cell pattern, or a repeating structural unit (i.e. focusing on structural walls) and/or a repeating channel unit (i.e. focusing on channels). Channels are adapted to allow fluid flow (for example, exhaust gas flow that may be comprised of gas and particulates), given appropriate conditions, such as fluid biometric flow, presence of plugs, particulate loading, and cell wall structure.

Thus, the honeycomb structure comprises a built up structure that comprises identifiable multiple repeating structural units (or multiple repeating cell pattern), or a plurality of repeating units (or plurality of repeating cell patterns), whether the plurality of repeating units is made up of a monolithic array of walls, or whether some portion of the honeycomb structure is an assembly of smaller components or segments bonded together to form a larger matrix of cells or groups of cells. In one set of embodiments, the intersecting walls are comprised of porous ceramic material, such as cordierite, cordierite magnesium aluminum titanate, mullite, aluminum titanate, silicon carbide, alumina, and combinations thereof.

In one aspect, the present disclosure relates to particulate filters comprised of a honeycomb structure comprising a large ratio of inlet to outlet cells and associated channels while also comprising some outlet cells, or channels, having a large hydraulic diameter relative to the inlet cells, or channels, for good pressure drop performance (both clean and soot loaded). The particulate filters, honeycomb bodies, and honeycomb structures also have a relatively large fraction of the inlet cell (or channel) surface bordering an outlet channel in order to provide favorable clean pressure drop performance, as well as soot-loaded pressure drop performance. In some embodiments, the particulate filters, honeycomb bodies, and honeycomb structures disclosed herein provide for both good ash storage and low pressure drop.

In another aspect, a honeycomb structure is provided comprising a matrix of intersecting porous cell walls extending in an axial direction between an inlet and outlet end of the honeycomb structure, the matrix defining a plurality of inlet cells and outlet cells, and corresponding inlet channels and outlet channels defined by respective inlet cells and respective outlet cells, wherein at least a portion of the outlet channels are larger in cross-sectional area than any of the inlet channels, and at least some of the outlet channels comprise a rectangular shape.

In another aspect, an extrusion die is provided. The extrusion die comprises an outlet face of a die body comprising a matrix of intersecting slots comprising a partial slot type, the matrix defining a die repeat unit, wherein the partial slot type extends less than entirely across the outlet face, the die repeat unit comprising: four or more die pins made up of a first die pin type and a second die pin type, the first die pin type larger in cross-sectional area than the second die pin type and comprises a rectangular shape in cross-section with two first sides of length Lo and two second sides of width Wo, wherein Lo>Wo, and a slot of the partial slot type terminating with a T-intersection on at least one of the first sides, and the second die pin type comprising a side length Li that is less than half the length of the first side of length Lo.

In yet another aspect, a method of manufacturing a honeycomb body comprising a honeycomb structure is provided. The method comprises providing an extrusion die comprising: an outlet face of a die body comprising a matrix of intersecting slots comprising a partial slot type, the matrix defining a die repeat unit, wherein the partial slot type extends less than entirely across the outlet face, the die repeat unit comprising: four or more die pins made up of a first die pin type and a second die pin type, the first die pin type larger in cross-sectional area than the second die pin type and comprises a rectangular shape in cross-section with two first sides of length Lo and two second sides of width Wo, wherein Lo>Wo, and a slot of the partial slot type terminating with a T-intersection on at least one of the first sides, and the second die pin type comprising a side length Li that is less than half the length of the first side of length Lo; extruding a batch mixture through the matrix of intersecting slots to form a green body; and heating or firing the green body to form a body comprising a honeycomb structure which comprises a matrix of intersecting porous cell walls extending axially between an inlet end and an outlet end of the honeycomb structure, the matrix defining a plurality of inlet cells and outlet cells, and corresponding inlet channels and outlet channels defined by respective inlet cells and respective outlet cells, wherein at least a portion of the outlet channels are larger in cross-sectional area than any of the inlet channels, and at least some of the outlet channels comprise a rectangular shape in cross-section.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 1A schematically depicts and illustrates a representative portion of a known honeycomb structure for a particulate filter having a plugging pattern with a square cell array structure, or matrix, or web of walls with equal size inlet cells and outlet cells (plugs of the outlet cells shown hatched).

FIG. 1B illustrates a repeating structural unit of the honeycomb structure of FIG. 1A.

FIG. 2A schematically depicts and illustrates a representative portion of a honeycomb structure for a particulate filter having plugs disposed in a known plugging pattern with a square cell array structure, or matrix, or web of walls, in an asymmetric design of larger inlet cells and smaller outlet cells (plugs of the outlet cells shown hatched).

FIG. 2B illustrates a repeating structural unit of the honeycomb structure of the asymmetric design of FIG. 2A.

FIG. 3A illustrates a representative portion of a comparative plugged honeycomb structure of a particulate wall-flow filter having plugs disposed in a plugging pattern which results in a higher number of inlet cells than outlet cells (shown hatched).

FIG. 3B illustrates a repeating structural unit of the honeycomb structure of FIG. 3A.

FIG. 4A shows a representative portion of a plugged honeycomb structure of a particulate filter according to one or more embodiments of the disclosure.

FIG. 4B illustrates a repeating structural unit of the plugged honeycomb structure of FIG. 4A according to one or more embodiments of the disclosure.

FIG. 4C is a partial cross-sectioned side view of a filter comprising the plugged honeycomb structure of FIG. 4A taken along section line 4C-4C and illustrating the plugging pattern and relatively-larger outlet channels according to one or more embodiments of the disclosure.

FIG. 5A shows a representative portion of an example of a plugged honeycomb structure of a particulate filter according to one or more embodiments of the disclosure.

FIG. 5B illustrates a repeating structural unit of the plugged honeycomb structure of FIG. 5A according to one or more embodiments of the disclosure.

FIG. 5C shows a representative portion of an example of a plugged honeycomb structure of a particulate filter according to one or more embodiments of the disclosure.

FIG. 5D illustrates a repeating structural unit of the plugged honeycomb structure of FIG. 5C according to one or more embodiments of the disclosure.

FIG. 6A illustrates a representative portion of an example of a plugged honeycomb structure of a particulate filter according to one or more embodiments of the disclosure.

FIG. 6B illustrates a repeating structural unit of the plugged honeycomb structure of FIG. 6A according to one or more embodiments of the disclosure.

FIG. 6C illustrates rounded corners of a honeycomb structure according to one or more embodiments of the disclosure.

FIG. 6D illustrates beveled corners of a honeycomb structure according to one or more embodiments of the disclosure.

FIG. 9A illustrates a representative portion of an example of a plugged honeycomb structure of a particulate filter according to one or more embodiments of the disclosure.

FIG. 9B illustrates a repeating structural unit of the plugged honeycomb structure of FIG. 9A according to one or more embodiments of the disclosure.

FIG. 10A illustrates a representative portion of an example of a plugged honeycomb structure of a particulate filter according to one or more embodiments of the disclosure.

FIG. 10B illustrates a repeating structural unit of the plugged honeycomb structure of FIG. 10A according to one or more embodiments of the disclosure.

FIG. 11A illustrates a representative portion of an example of a plugged honeycomb structure of a particulate filter according to one or more embodiments of the disclosure.

FIG. 11B illustrates a repeating structural unit of the plugged honeycomb structure of FIG. 11A according to one or more embodiments of the disclosure.

FIG. 12A illustrates a representative portion of an example of a plugged honeycomb structure of a particulate filter according to one or more embodiments of the disclosure.

FIG. 12B illustrates a repeating structural unit of the plugged honeycomb structure of FIG. 12A according to one or more embodiments of the disclosure.

FIG. 13A illustrates a representative portion of an example of a plugged honeycomb structure of a particulate filter according to one or more embodiments of the disclosure.

FIG. 13B illustrates a repeating structural unit of the plugged honeycomb structure of FIG. 13A according to one or more embodiments of the disclosure.

FIG. 14A illustrates a representative portion of an example of a plugged honeycomb structure of a particulate filter according to one or more embodiments of the disclosure.

FIG. 14B illustrates a repeating structural unit of the plugged honeycomb structure of FIG. 14A according to one or more embodiments of the disclosure.

FIG. 17A shows a photograph of the inlet and outlet faces of a comparative plugged honeycomb structure (17A, design A).

FIG. 17B shows a photograph of the inlet and outlet faces of a comparative plugged honeycomb structure (17B, design B).

FIG. 17C shows a photograph of the inlet and outlet faces of plugged honeycomb structure according to embodiments disclosed herein (17C, design C), wherein the inlet face of example 17C is shown after soot loading.

FIG. 18A schematically depicts clean pressure drop as a function of (cold) flow rate for the structures FIGS. 17A, 17B, and 17C.

FIG. 19A shows a photograph of the plugged inlet end (upper picture) and outlet end (lower picture) of comparative design 22A having an asymmetric honeycomb structure similar to that shown in FIGS. 2A and 2B with a geometry of 300 cells per square inch, cell wall thickness of 7 mils ("300/7 geometry"), and an inlet-to-outlet cross-sectional area ratio of 1.7:1.

FIG. 19B shows a photograph of the plugged inlet end (upper picture) and outlet end (lower picture) of comparative design 22B having a symmetric honeycomb structure similar to that shown in FIGS. 1A and 1B with a geometry of 200 cells per square inch, cell wall thickness of 8 mils ("200/8 geometry"), and an inlet-to-outlet cross-sectional area ratio of 1:1.

FIG. 19C shows a photograph of the plugged inlet end (upper picture) and outlet end (lower picture) of design 22C having a honeycomb structure 500 similar to that shown in FIGS. 5C and 5D with a geometry of 400 cells per square inch, cell wall thickness of 8 mils ("400/8 geometry"), and an inlet to outlet cross-sectional area ratio of 1.8:1.

FIG. 19D shows a photograph of the plugged inlet end (upper picture) and outlet end (lower picture) of design 22D having a honeycomb structure 500 similar to that shown in FIGS. 5C and 5D with a geometry of 300 cells per square inch, cell wall thickness of 8 mils ("300/8 geometry"), and an inlet to outlet cross-sectional area ratio of 1.9:1.

FIG. 22A schematically illustrates an example of a plugged honeycomb structure comprising one or more cell walls that are thicker than nearby cell walls of the same honeycomb structure according to one or more embodiments.

FIG. 22B schematically illustrates an example of a repeating structural unit comprising one or more cell walls that are thicker than nearby cell walls of the same repeating structural unit according to one or more embodiments.

FIG. 22C schematically illustrates another example of a plugged honeycomb structure comprising multiple cell walls that are thicker than nearby cell walls of the same honeycomb structure and that extend in two orthogonal directions according to one or more embodiments.

DETAILED DESCRIPTION

Figure 4D:
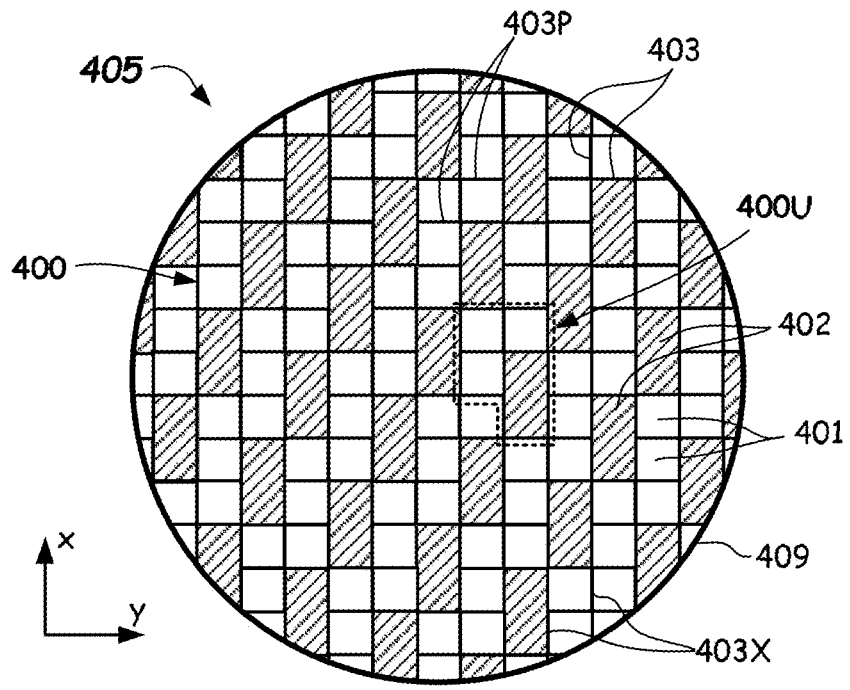
FIG. 4D illustrates an inlet end view of a plugged honeycomb structure of a filter comprising a repeating structural unit of FIG. 4B with plugs shown as hatched according to one or more embodiments of the disclosure.

Reference will now be made in detail to embodiments of particulate filters, honeycomb structure bodies, such as porous ceramic honeycomb articles, porous ceramic wall-flow diesel particulate filters and honeycomb structures thereof, embodiments of which are illustrated in the accompanying drawings. Whenever possible, the same reference numerals will be used throughout the drawings to refer to the same or like parts.

As seen in the known structure of FIGS. 1A and 1B, every other channel is plugged in a checkerboard pattern at one face, and the opposite channels are plugged at the other face. In such structures, 50% of the channels are inlet channels and in each inlet channel, all four walls of the inlet cell defining the inlet channel are shared with neighboring outlet cells that define neighboring outlet channels. All inlet channels have the same cross-sectional area as the outlet cells. Therefore, 100% of the inlet walls in the representative portion of the honeycomb structure can be considered to be "filtration walls," that are configured to directly filter particulates Of course when considering an entire honeycomb structure of a filter, not every wall need be a filtration wall, such as the border provided by an outer peripheral skin, which may be nonporous or less porous than the bulk of the walls of the honeycomb structure.

FIGS. 2A and 2B illustrate another known plugged honeycomb structure that provides an increased inlet volume (for example, as compared to the structure of FIG. 1A having equal-sized inlet and outlet channels) wherein the size of the inlet channels is large relative to the outlet channels in order to provide increased ash storage in the larger inlet channels of the inlet cells. Such structures are referred to as having asymmetric cells, or asymmetric cell sizes. Larger hydraulic diameter ratios of such asymmetric cell designs can provide reduced frequency of filter cleaning intervals, however very large hydraulic diameter ratios can result in larger pressure drop that results as the size of the outlet channels (e.g. the hydraulic diameter of the outlet channels) decreases. That is, if the inlet-to-outlet cell (or inlet-to-outlet channel) size ratio is increased to a large degree, the smaller size of the outlet channels can result in quite a large penalty in pressure drop. In addition, die design and manufacture can become more difficult and costly as the size of the outlet channels is further reduced. For example, small pins would be used to produce the small outlet channels and such small pins may not be well anchored to the die and may be more relatively easy to break off during extrusion or handling. Furthermore, very small channels can become difficult to plug due to their small size. In addition, the position of the wall separating one pair of inlet & outlet channels from another in one wall becomes more offset from the wall separating a nearby pair of inlet & outlet channels in the row below. With such an offset, the load carrying capacity of the structure in that direction may become lowered relative to a structure having straighter walls. Furthermore, extrusion dies for such asymmetric cell designs tend to be relatively costly and complicated to manufacture such as by electrical discharge machining (EDM) and more complex electrodes.

FIGS. 3A and 3B shows a representative portion of another known plugged honeycomb structure that can provide an increased ash storage capacity by virtue of plugs disposed in a plugging pattern which has a higher number of inlet channels than outlet channels. The comparative structure has an inlet:outlet channel count ratio of 3:1 (number of inlet channels to number of outlet channels). Inlet channels are depicted by no shading, wherein the outlet channels are depicted as being shaded (hatched). In this honeycomb structure, there are 2 types of inlet cells, which are labeled A and B. In A-type inlet cells, there are 2 walls shared with neighboring outlet cells (one wall shared with each neighboring outlet channel). In B-type inlet cells, there is one shared wall with a neighboring outlet cell (of a neighboring outlet channel), the other three walls are shared with other neighboring inlet cells. In this structure, there are one A-type inlet cell and 2 B-type inlet cells in each repeating structural unit (otherwise referred to as a unit block, a repeating unit, or a repeating channel unit). Thus, this honeycomb structure employs, on average, 33% of inlet walls for direct filtration. Although this structure provides an increased inlet volume (or area) by 50% and therefore results in a large increase in ash storage capacity, this structure would suffer from a pressure drop penalty because all the outlet flow is restricted to a small number of relatively small outlet channels.

For both of the designs illustrated in FIGS. 2A-2B and 3A-3B, a pressure drop penalty develops due to either the small hydraulic diameter of the outlet cells, or the reduced number of outlet channels available to carry the flow. In both of those cases, the pressure drop penalty due to the outlet channel can be relatively severe.

In contrast to known filters and honeycomb structures represented by FIGS. 1A-1B, 2A-2B or 3A-3B, the filters and plugged honeycomb structure bodies disclosed herein comprise honeycomb structures which help to mitigate these issues by comprising one or more outlet cells (or channels) of increased hydraulic diameter relative to the inlet cells (or channels). For example, in various embodiments disclosed herein, a combination of square and rectangular cells achieves an advantageous geometry of the honeycomb structure, wherein the inlet cells and channels are squares and at least some of the outlet cells and channels are rectangles (i.e., non-squares). "Rectangle" or "non-square rectangle" as used herein means a quadrilateral with four right angles and two sides of longer length than the other two sides, and "rectangular" means having a non-square rectangular shape or outline, or the shape or shape of a quadrilateral with four right angles and two sides of longer length than the other two sides.

In the example embodiments disclosed below, the ratio of inlet-to-outlet volume (or ratio of cross-sectional areas) is given, as well as the average fraction of the inlet cell surface that is shared with an outlet cell. In one or more embodiments, both the ratio of inlet-to-outlet volume and the average fraction of the inlet cell surface that is shared with an outlet cell are relatively high values. Higher ratios of inlet-to-outlet volume may provide increased ash storage capacity. Higher fractions (e.g., ratios) of shared inlet:outlet walls serves to mitigate pressure drop increases for both clean and soot loaded pressure drops.

In one or more embodiments, the honeycomb structure comprises a plurality of repeating structural units (e.g. unit blocks) which when disposed adjacent to each other to form at least a portion of the honeycomb structure. The repeating structural units can be characterized as having one or more of A-type inlet cells having 2 walls shared with neighboring outlet cells, B-type inlet cells having one shared wall with a neighboring outlet cell, or X-type inlet cells (or channels) having no shared walls with a neighboring outlet cell, or combinations thereof. As used herein, "neighboring cell" refers to a cell which is directly adjacent (abutting) another cell. Various embodiments may comprise A-type inlet cells, B-type inlet cells, or X-type inlet cells, or combinations thereof. In the Figures, the inlet channels corresponding to inlet cells are depicted by having no shading, and outlets channels corresponding to outlet cells are depicted as including hatched shading. In one set of embodiments, plugs are disposed in at least some of the channels at or near an inlet end or inlet face, and plugs are disposed in at least some of the channels at or near the outlet end or outlet face, opposite the inlet end.

A first embodiment of a honeycomb structure 400 comprising a portion of a honeycomb structural body of a particulate filter according to embodiments of the disclosure is shown in FIGS. 4A-4E. The honeycomb structure 400 has an inlet-to-outlet volume ratio of 1.5:1 and having an Inlet/Outlet ratio approximately equal to 3/1, and each inlet cell 401 of the repeating structural unit 400U (shown in FIG. 4B and outlined in a dotted line in FIG. 4A) shares two of its walls (i.e. all inlet cells 401 have two shared outlet walls) with neighboring outlet cells, so that the average filtration area is approximately 50%. The inlet cells 401 labeled $A^1$ and $A^0$ have either two opposing walls shared with outlet cells (labeled $A^0$) or two orthogonal walls shared with adjacent outlet cells (labeled $A^1$). In one set of embodiments, and in the embodiment of FIGS. 4A-4E, the repeating structural unit 400U (unit block) comprises a rectangular outlet cell 402 (and associated rectangular outlet channel), and square inlet cells 401 (and associated square inlet channels). In the case of the FIGS. 4A-4E embodiment, the outlet length Lo measured in cross-section from end wall-to-end wall along a long dimension of the rectangular outlet cell 402 can be a wall thickness more than twice (for example, more than 2.01 times, or more than 2.1 times, or more than 2.5 times, or more than 3 times, etc.) the inlet length Li measured end wall-to-end wall thereof; in some embodiments, the wall thickness may be twice or more than twice (for example greater than or equal to two times) the inlet length Li measured end wall-to-end wall. The outlet width Wo may be equal to the inlet length Li. For example, Lo may range between about 0.075 inch (1.91 mm) and about 0.125 inch (3.18 mm) and Li and Wo may range between about 0.035 inch (0.89 mm) and about 0.055 inch (3.18 mm). Other values of Lo and Li may be used.

As shown in FIG. 4C, the honeycomb structure 400 comprises inlet cells 401 and outlet cells 402 formed by a matrix of intersecting porous cell walls 403 (a few labeled). The inlet cells 401 may be unplugged at the inlet end 404 and may be plugged with outlet-end plugs 408 at or near the outlet end 406. The outlet cells 402 may be plugged at or near the inlet end 404 with inlet-end plugs 407 and may be unplugged at the outlet end 406. The plugging may be to a depth of about 5 to 20 mm, although this can vary. Any suitable plugging cement may be used for the particular ceramic material making up the cell walls 403.

Figure 4E:
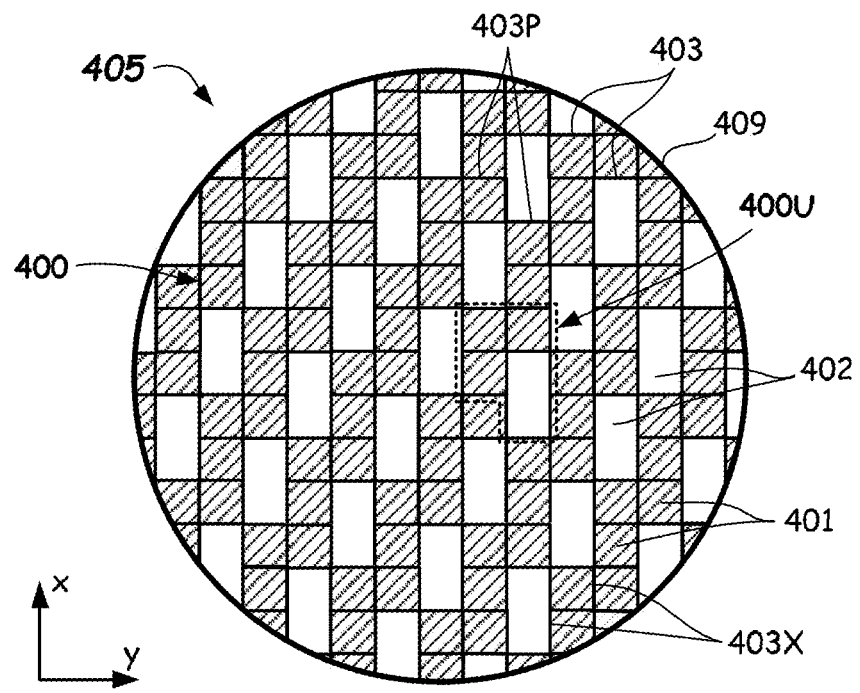
FIG. 4E illustrates an outlet end view of a plugged honeycomb structure of a filter comprising a repeating structural unit of FIG. 4B with plugs shown as hatched according to one or more embodiments of the disclosure.

As can be seen in FIGS. 4D and 4E, the repeating structural unit 400U is repeated throughout the honeycomb structure 400 of the honeycomb body of the particulate filter 405. Plugs are shown as hatched in all inlet and outlet views shown herein. In particular, the outlet cells 402 of rectangular cross-section may be interspersed uniformly within the honeycomb structure 400, in some embodiments. Within the honeycomb structure 400, there are two kinds of cell walls 403 present, namely, first walls that extend entirely across the honeycomb structure 400 of the particulate filter 405 (e.g., from one portion of the skin 409 to another portion of the skin 409) and partial walls 403P that do not extend all the way across the honeycomb structure 400, but that only extend part way across the honeycomb structure 400 and which terminate within the honeycomb structure 400. Cell walls 403X are of the first type of walls in this embodiment and they extend entirely across a width of the particulate filter 405 in the x direction from one side to the other, and partial walls 403P that extend in a second direction (e.g., in the y direction) orthogonal to the first direction x. The partial walls 403P within the honeycomb structure 400 terminate at a side of an outlet cell 402 at a T-intersection with a side wall of the outlet cell 402, i.e., at mid span. Thus, in this embodiment of FIGS. 4A-4E, the cell walls 403X of the first type extend in the first direction x and the partial walls 403P extend in the second direction y. The partial walls 403P extend across two adjacent repeating structural units 400U in this embodiment.

Another embodiment of honeycomb structure 500 is shown in FIGS. 5A and 5B which comprises inlet cells 501 and outlet cells 502 formed by a matrix of intersecting porous cell walls 503 (a few labeled). The honeycomb structure 500 has comprises an inlet-to-outlet volume ratio of 2:1 and having an Inlet/Outlet ratio approximately equal to 4/1, and half the inlet cells 501 (labeled $A^0$) share two walls with a neighboring outlet cell 502 and the other half of the inlet cells 501 (labeled $B^2$) share one wall (plus two shared corners) with neighboring outlet cells so the average filtration area is approximately 37.5%. In one set of embodiments, the repeating structural unit 500U (unit block) has a rectangular outlet cell 502 (and associated rectangular outlet channel), and square inlet cells 501 (and associated square inlet channels). In this embodiment, each adjacent repeating structural unit 500U' positioned above and below the repeating structural unit 500U is shown as being staggered by one position along the row so that the outlet cell 502 of repeating structural unit 500U is not vertically aligned with an outlet cell 502' of an adjacent repeating structural unit 500U', i.e., they do not align in the same column, as shown. In this embodiment, the vertical walls 503X and horizontal walls 503Y each extends all the way across the honeycomb structure 500 of the honeycomb body. The partial walls 503P in this embodiment extend only one inlet width and terminate on sides of the outlet cells 502 at T-intersections.

FIGS. 5C and 5D disclose an embodiment where the structure of FIGS. 5A-5B has been turned on its side. In this embodiment, all of the cell walls 503 of the honeycomb structure 500" at a given x location are interconnected to form a first straight line of walls, and only a fraction of the walls at a given y location are interconnected to form a second straight line of walls. In this embodiment, all of the walls 503Y' extending in they direction may extend fully and entirely across the honeycomb structure 500" of the honeycomb body. In the x direction, some of the walls 503X' may extend fully across the honeycomb structure 500", while the partial walls 503P' do not extend fully across the honeycomb structure 500". All the other structure of this embodiment is the same as for FIGS. 5A-5B.

Another embodiment of a honeycomb structure 600 is shown in FIGS. 6A and 6B which comprises inlet cells 601 and outlet cells 602 formed by a matrix of intersecting porous cell walls 603 (a few labeled). The honeycomb structure 500 has an inlet-to-outlet volume ratio of 2:1, and half the inlet cells 601 (labeled $A^0$) share two walls with neighboring outlet cells 602 and the other half of the inlet cells 601 (labeled $B^2$) share one wall (preferably, plus two shared corners) with a neighboring outlet cell 602 so the average filtration area is 37.5% and the Inlet/Outlet ratio approximately equal to 16/4. In one set of embodiments the repeating structural unit 600U (e.g., unit block) has a plurality of rectangular outlet cell 602 (and associated rectangular outlet channel), and square inlet cells 601 (and associated square inlet channels). In this embodiment, the repeating structural unit 600U is shown staggered (e.g., by one column) from the directly adjacent repeating structural unit 600U'. In this embodiment, all the walls are partial walls 603P. Furthermore, in this embodiment, the outlet cells 602 with the repeating structural units 600U are arranged in different orientations with the long dimension of the outlet cells 602 being oriented vertically along the x direction in some instances, and oriented with the long dimension of the outlet cell 602 oriented along the y direction in other instances.

Figures 7A, 7B:
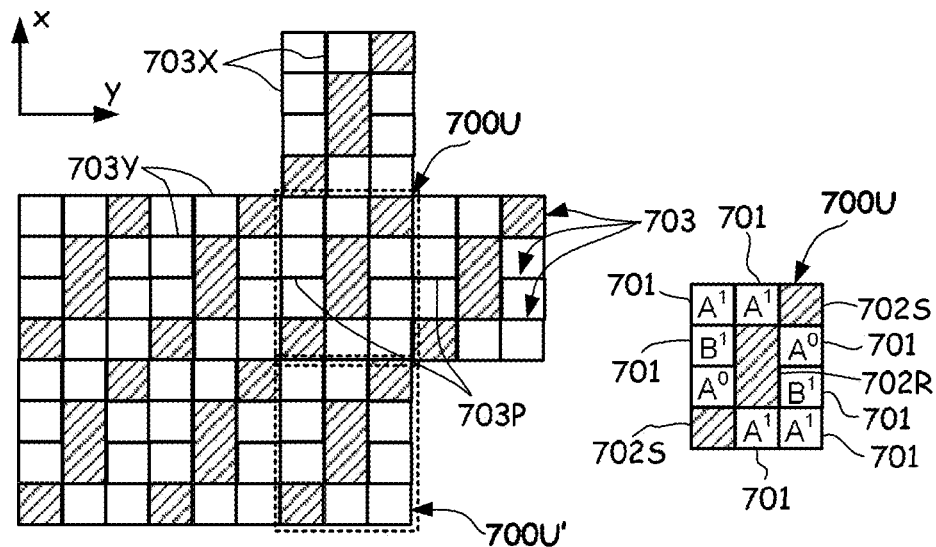
FIG. 7A illustrates a representative portion of an example embodiment a plugged honeycomb structure of a particulate filter according to one or more embodiments of the disclosure.
FIG. 7B illustrates a repeating structural unit of the plugged honeycomb structure of FIG. 7A according to one or more embodiments of the disclosure.

The honeycomb structure 700 shown in FIGS. 7A and 7B which comprises inlet cells 701 and outlet cells 702R, 702S formed by a matrix of intersecting porous cell walls 703 (a few labeled). The honeycomb structure 700 has an inlet-to-outlet volume ratio of 2:1 and an Inlet/Outlet ratio approximately equal to 8/3, and 75% of the inlet cells 701 (labeled $A^0$ or $A^1$) share two walls with neighboring outlet cells and 25% of the inlet cells 701 (labeled $B^1$) share one wall (preferably, plus one shared corner) with a neighboring outlet cell 702R so the average filtration area is 43.75%. In one set of embodiments the repeating structural unit 700U (e.g., unit block) has one rectangular outlet cell 702R, two square outlet cells 702S, and the inlet cells 701 are square. In the depicted embodiment, the repeating structural unit 700U is stacked upon, but not staggered from, an adjacent repeating structural unit 700U'. This embodiment comprises a combination of the first type of walls 703X and 703Y that extend all the way across the honeycomb structure 700 of the honeycomb body, and partial cells 703P that are two cells long. Moreover, in this embodiment, some of the outlet cells 702S comprise a square cross-sectional shape and some inlet cells 701R comprise a rectangular cross-sectional shape.

Figures 8A, 8B:
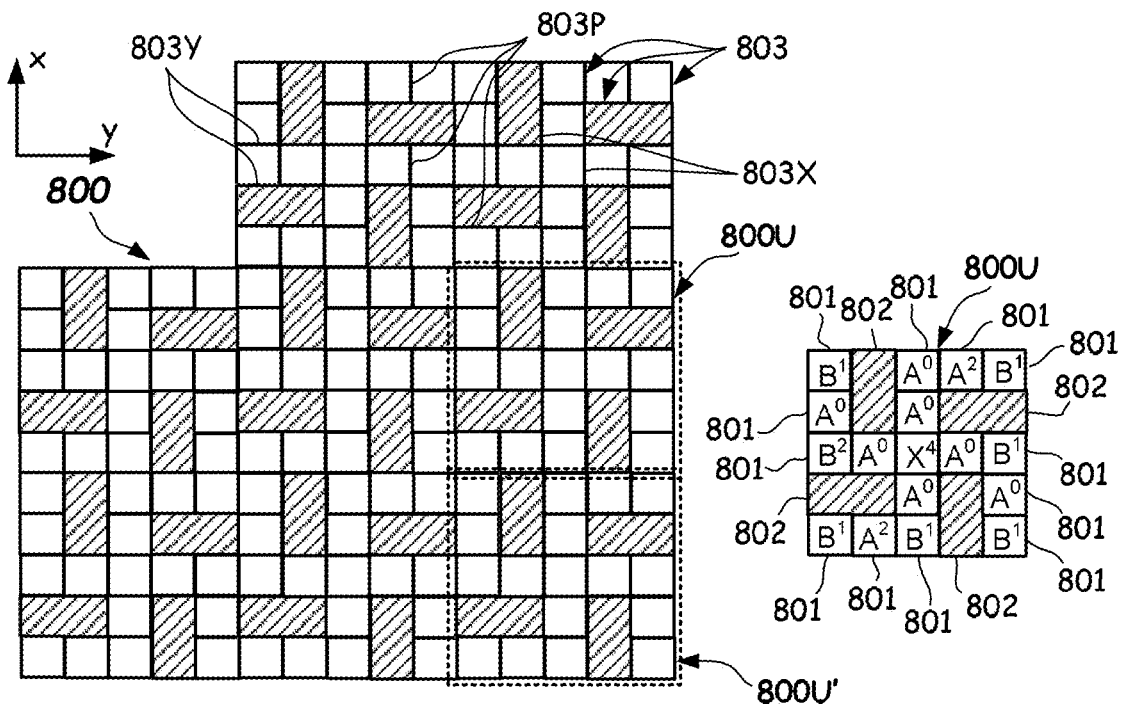
FIG. 8A illustrates a representative portion of an example of a plugged honeycomb structure of a particulate filter according to one or more embodiments of the disclosure.
FIG. 8B illustrates a repeating structural unit of the plugged honeycomb structure of FIG. 8A according to one or more embodiments of the disclosure.

The honeycomb structure 800 shown in FIGS. 8A and 8B which comprises inlet cells 801 and outlet cells 802 formed by a matrix of intersecting porous cell walls 803 (a few labeled). The honeycomb structure 800 has an inlet-to-outlet volume ratio of 2.125:1 and an Inlet/Outlet ratio approximately equal to 17/4, and approximately 47% of the inlet cells 801 (labeled $A^0$ and $A^2$) share two walls with a neighboring outlet cell, approximately 47% share one wall with neighboring outlet cells 802, and approximately 6% of the inlet cells 801 (labeled $X^4$) have no shared walls (preferably, and four shared corners) with neighboring outlet cells 802, so the average filtration area is approximately 35.3%. In one set of embodiments the repeating structural unit 700U (unit block) has a rectangular outlet cell 802 (and associated rectangular outlet channel), and square inlet cells 801 (and associated square inlet channels). In the depicted embodiment, the repeating structural unit 800U is stacked upon, but not staggered from, an adjacent repeating structural unit 800U'. This embodiment comprises a combination of the first type of walls 803X and 803Y that extend all the way across the honeycomb structure 800 of the honeycomb body in both the x and y directions, and partial walls 803P that are four cells long and extend part way in both the x and y directions; each partial wall 803P terminating at a side wall of an outlet cell 802 with a T-intersection. Furthermore, in this embodiment, the outlet cells 802 with the repeating structural units 800U are arranged in different orientations with the long dimension of the outlet cells 802 being oriented vertically along the x direction in some instances, and oriented with the long dimension of the outlet cell 802 oriented along the y direction in other instances.

The honeycomb structure 900 shown in FIGS. 9A and 9B which comprises inlet cells 901 and outlet cells 902 formed by a matrix of intersecting porous cell walls 903 (a few labeled). The honeycomb structure 900 has an inlet-to-outlet volume ratio of 2.5:1 and an Inlet/Outlet ratio approximately equal to 5/1, and 20% of the inlet cells 901 (labeled A) share two walls with neighboring outlet cells 902, and 80% of the inlet cells 901 (labeled B) share one wall (plus one shared corner) with a neighboring outlet cell 902, so the average filtration area is 30%. In one set of embodiments, the repeating structural unit 800U (unit block) has a rectangular outlet cell 902 (and associated rectangular outlet channel), and square inlet cells 901 (and associated square inlet channels). This embodiment comprises a combination of the first type of walls 903X that extend all the way across the honeycomb structure 900 of the honeycomb body in the x direction, and partial walls 903P of varying length that extend part way in both the y directions; each partial wall 903P terminating at a side wall of an outlet cell 902 with a T-intersection.

The honeycomb structure 1000 shown in FIG. 10 which comprises inlet cells 1001 and outlet cells 1002 formed by a matrix of intersecting porous cell walls 1003 (a few labeled). The honeycomb structure 1000 has an inlet-to-outlet volume ratio of 3:1 and an Inlet/Outlet ratio approximately equal to 6/1, and 33% of the inlet cells 1001 (labeled A) share two walls with a neighboring outlet cell 1002, 33% of the inlet cells 1001 (labeled B) share one wall with a neighboring outlet cell 1002, and 33% of the inlet cells 1001 (labeled X) have no common wall (preferably, plus two shared corners) with a neighboring outlet cell 1002, so the average filtration area is 25%. In one set of embodiments, the repeating structural unit 1000U (e.g., unit block) has a rectangular outlet cell 1002 (and associated rectangular outlet channel), and square inlet cells 1001 (and associated square inlet channels). This embodiment comprises a combination of the first type of walls 1003X and 1003Y that extend all the way across the honeycomb structure 1000 of the honeycomb body in both the x and y directions, and partial walls 1003P that are one cell wide and extend part way in the y directions; each partial wall 1003P terminating at a side wall of an outlet cell 1002 with a T-intersection.

The honeycomb structure 1100 shown in FIG. 11 which comprises inlet cells 1101 and outlet cells 1102 formed by a matrix of intersecting porous cell walls 1103 (a few labeled). The honeycomb structure 1100 has an inlet-to-outlet volume ratio of 3:1 and an Inlet/Outlet ratio approximately equal to 6/1, and all of the inlet cells 1101 (labeled B) share one wall with a neighboring outlet cell 1102 (preferably, wherein two cells (labeled $B^0$) in the repeating structural unit 1100U (unit block) have a shared wall and no shared corners, and wherein four cells (labeled $B^1$) in the repeating structural unit 1100U have a shared wall and one shared corner), so the average filtration area is 25%. In one set of embodiments the repeating structural unit 1100U (unit block) has a rectangular outlet cell 1102 (and associated rectangular outlet channel), and square inlet cells 1101 (and associated square inlet channels). This embodiment comprises a combination of the first type of walls 1103X and 1103Y that extend all the way across the honeycomb structure 1100 of the honeycomb body in both the x and y directions, and partial walls 1103P that are four cells long and extend part way in both the x and y directions; each partial wall 1103P terminating at a side wall of an outlet cell 1102 with a T-intersection.

The honeycomb structure 1200 shown in FIG. 12 which comprises inlet cells 1201 and outlet cells 1202 formed by a matrix of intersecting porous cell walls 1203 (a few labeled). The honeycomb structure 1200 has an inlet-to-outlet volume ratio of 3:1 and an Inlet/Outlet ratio approximately equal to 6/1, and all of the inlet cells 1201 share one wall with a neighboring outlet cell 1202, (preferably, wherein some inlet cells 1201 (labeled $B^1$) share one wall and one corner, and other inlet cells 1201 (labeled $B^0$) share one wall and no corners) so the average filtration area is 25%. In one set of embodiments, the repeating structural unit 1200U (unit block) has a rectangular, non-square outlet cell 1202 (and associated rectangular outlet channel), and square inlet cells 1021 (and associated square inlet channels). This embodiment comprises a combination of the first type of walls 1203X and 1203Y that extend all the way across the honeycomb structure 1200 of the honeycomb body in both the x and y directions (every other set of walls), and partial walls 1203P that extend part way in both the x and y directions; each partial wall 1203P terminating at a side wall of an outlet cell 1202 with a T-intersection. Furthermore, in this embodiment, the outlet cells 1202 and repeating structural units 1200U, 1200U' are arranged in different orientations throughout the honeycomb structure 1200 with the long dimension of the outlet cells 1202 being oriented vertically along the x direction in some instances, and oriented with the long dimension of the outlet cell 1202 oriented along they direction in other instances.

The honeycomb structure 1300 shown in FIG. 13 which comprises inlet cells 1301 and outlet cells 1302 formed by a matrix of intersecting porous cell walls 1303 (a few labeled). The honeycomb structure 1300 has an inlet-to-outlet volume ratio of 3.5:1 and an Inlet/Outlet ratio approximately equal to 7/1, and 86% of the inlet cells 1301 (labeled $B^0$ and $B^1$) share one wall with a neighboring outlet cell 1302, and 14% of the inlet cells 1301 (labeled $X^2$) have no common wall (and two shared corners) with a neighboring outlet cell 1302, so the average filtration area is 21.4%. In one set of embodiments, the repeating structural unit 1300U (unit block) has a rectangular outlet cell 1302 (and associated rectangular outlet channel), and square inlet cells 1301 (and associated square inlet channels). This embodiment comprises a combination of the first type of walls 1303X and 1303Y that extend all the way across the honeycomb structure 1300 of the honeycomb body in both the x and y directions, and partial walls 1303P that extend part way in they direction; each partial wall 1303P being two cells wide and terminating at a side wall of an outlet cell 1302 with a T-intersection.

The honeycomb structure 1400 shown in FIG. 14 which comprises inlet cells 1401 and outlet cells 1402 formed by a matrix of intersecting porous cell walls 1403 (a few labeled). The honeycomb structure 1400 has an inlet-to-outlet volume ratio of 4:1 and an Inlet/Outlet ratio approximately equal to 8/1, and 75% of the inlet cells 1401 (labeled $B^1$ or $B^0$) share one wall (and either one shared corner, or no shared corner) with a neighboring outlet cell 1402, and 25% of the inlet cells 1401 (labeled $X^1$) have no common wall (and one shared corner) with a neighboring outlet cell 1402, so the average filtration area is 18.75%. In one set of embodiments, the repeating structural unit 1400U (unit block) has a rectangular outlet cell 1402 (and associated rectangular outlet channel), and square inlet cells 1401 (and associated square inlet channels). This embodiment comprises a combination of the first type of cell walls 1403X and 1403Y that extend all the way across the honeycomb structure 1400 of the honeycomb body in both the x and y directions, and partial walls 1403P that extend part way in the y direction; each partial wall 1403P being four cells wide and terminating at a side wall of an outlet cell 1402 with a T-intersection.

Figures 15A, 15B:
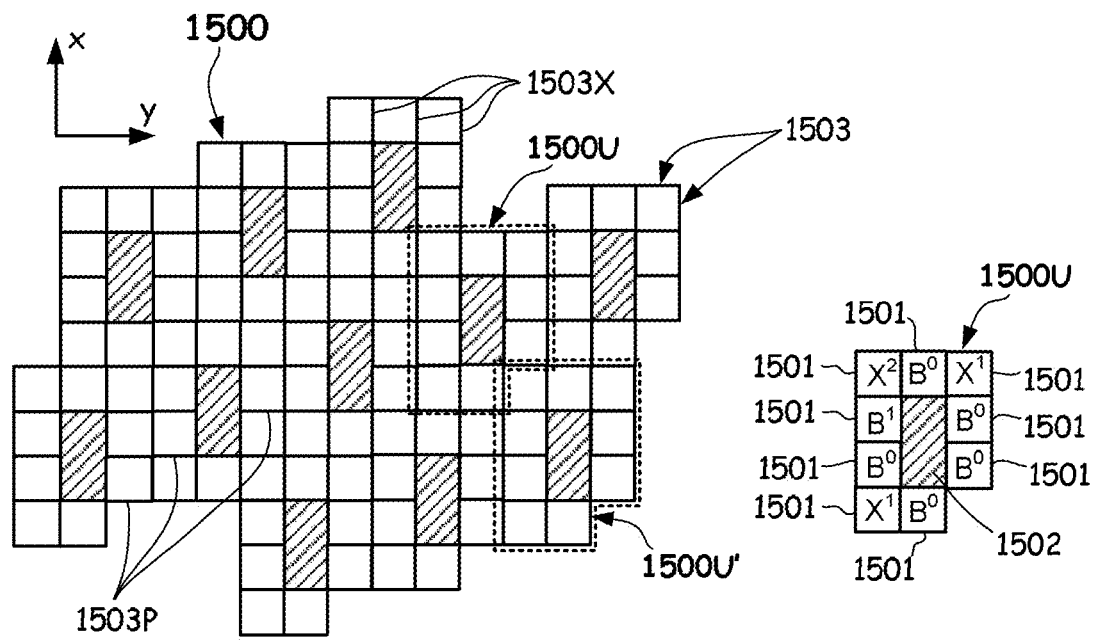
FIG. 15A illustrates a representative portion of an example embodiment a plugged honeycomb structure of a particulate filter according to one or more embodiments of the disclosure.
FIG. 15B illustrates a repeating structural unit of the plugged honeycomb structure of FIG. 15A according to one or more embodiments of the disclosure.

The honeycomb structure 1500 shown in FIG. 15 which comprises inlet cells 1501 and outlet cells 1502 formed by a matrix of intersecting porous cell walls 1503 (a few labeled). The honeycomb structure 1500 has an inlet-to-outlet volume ratio of 4.5:1 and an Inlet/Outlet ratio approximately equal to 9/1, and two thirds of the inlet cells 1501 (labeled $B^0$) share one wall (and no corner) with a neighboring outlet cell, and one third of the inlet cells have no common wall (one with two shared corners labeled $X^2$, the remainder with one shared corner labeled $X^1$) with a neighboring outlet cell, so the average filtration area is 16.7%. In one set of embodiments, the repeating structural unit 1400U (unit block) has a rectangular outlet cell 1502 (and associated rectangular outlet channel), and square inlet cells 1501 (and associated square inlet channels). This embodiment comprises a combination of the first type of walls 1503X that extend all the way across the honeycomb structure 1400 of the honeycomb body in the x direction, and partial walls 1503P that extend part way in the y direction; each partial wall 1503P terminating at a side wall of an outlet cell 1502 with a T-intersection.

Figures 16A, 16B:
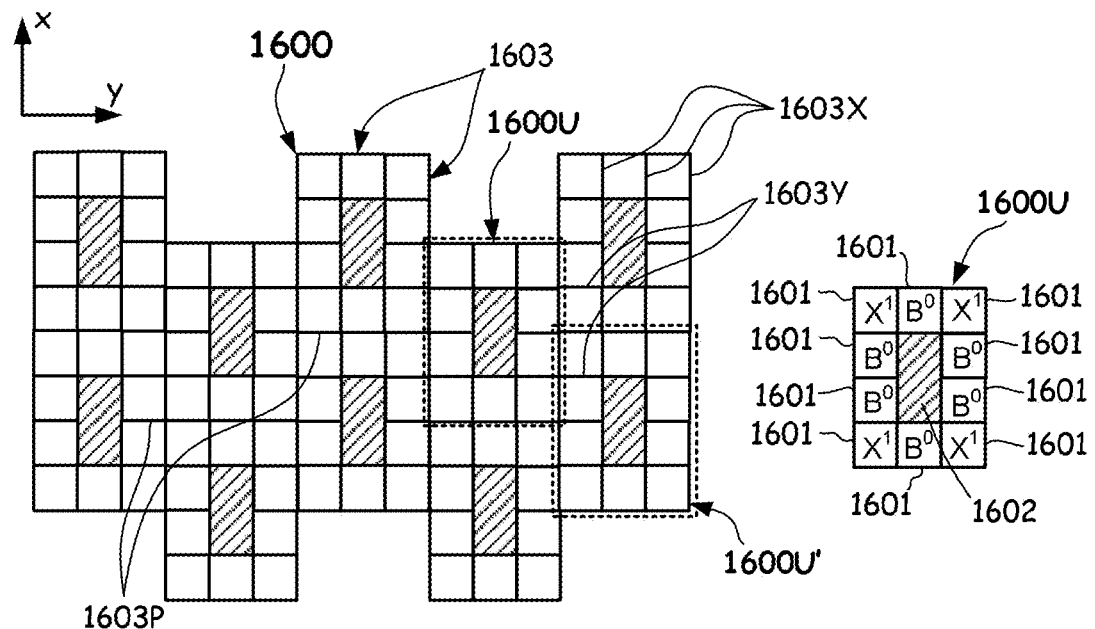
FIG. 16A illustrates a representative portion of an example of a plugged honeycomb structure of a particulate filter according to one or more embodiments of the disclosure.
FIG. 16B illustrates a repeating structural unit of the plugged honeycomb structure of FIG. 16A according to one or more embodiments of the disclosure.

The honeycomb structure 1600 shown in FIG. 16 which comprises inlet cells 1601 and outlet cells 1602 formed by a matrix of intersecting porous cell walls 1603 (a few labeled). The honeycomb structure 1600 has an inlet-to-outlet volume ratio of 5:1 and an Inlet/Outlet ratio approximately equal to 10/1, and 60% of the inlet cells 1601 (labeled $B^0$) share one wall (and no shared corner) with a neighboring outlet cell 1602, and 40% of the inlet cells 1601 (labeled $X^1$) have no common wall (and one shared corner) with a neighboring outlet cell 1602, so the average filtration area is 15%. In one set of embodiments, the repeating structural unit 1600U (unit block) has a rectangular outlet cell 1602 (and associated rectangular outlet channel), and square inlet cells 1601 (and associated square inlet channels). This embodiment comprises a combination of the first type of walls 1603X and 1603Y that extend all the way across the honeycomb structure 1600 of the honeycomb body in both the x and y directions, and partial walls 1603P that extend part way in the y direction; each partial wall 1603P being five cells wide and terminating at a side wall of an outlet cell 1602 with a T-intersection.

Thus, in various embodiments, a filter, or particulate filter, is disclosed herein, comprising a honeycomb body comprising a honeycomb structure (e.g., honeycomb structures 400-1600) comprising a matrix of intersecting porous cell walls (e.g., porous cell walls 403-1600P) extending axially between an inlet end (e.g., inlet end 404) and an outlet end (e.g., 406) of the honeycomb structure, the matrix of intersecting porous cell walls (e.g., cell walls 403-1603) defining a plurality of inlet cells (e.g., inlet cells 401-1601) and outlet cells (e.g., outlet cells 402-1602), and corresponding inlet channels and outlet channels defined by respective inlet and outlet cells, wherein at least a portion of the outlet channels are larger in cross-sectional area than any of the inlet channels, and wherein at least some of the outlet channels (e.g., corresponding to outlet cells 402-1602) are rectangular. In some embodiments, each of the outlet channels (e.g., outlet cells 402-1602) is larger in cross-sectional area than any of the inlet channels (e.g., inlet channels 401-1601). In some embodiments, some of the outlet channels (and outlet cells 702S of FIGS. 7A-7B) have cross-sectional area equal to the cross-sectional area of the inlet channels (and inlet cells 701).

In some embodiments, a filter, particulate filter, or honeycomb body is disclosed herein, comprising a honeycomb structure (e.g., honeycomb structure 400-1600) comprising an matrix of interconnected porous walls (e.g., interconnected cell walls 403-1603) comprising an array of cells comprised of inlet cells (e.g., inlet cells 401-1601) and outlet cells (e.g., outlet cells 402-1602) defining an array of inlet channels and outlet channels, respectively ("array of channels"), each inlet cell or inlet channel having an inlet hydraulic diameter, and each outlet cell or outlet channel having an outlet hydraulic diameter, wherein at least a portion of the outlet cells or outlet channels have an outlet hydraulic diameter larger than the inlet hydraulic diameter of any of the inlet cells or inlet channels, and wherein at least some of the outlet channels (e.g., outlet cells 402-1602) have a rectangular cross-section. The rectangular shape is defined by a perimeter of the intersecting porous walls 403 of that particular outlet cell 402-1602. In some embodiments, each of the outlet cells, or outlet channels, has an outlet hydraulic diameter larger than the inlet hydraulic diameter of any of the inlet channels, or inlet cells. In some embodiments, some of the outlet cells, or outlet channels, have an outlet hydraulic diameter equal to the inlet hydraulic diameter of an inlet channel, or inlet cell, such as shown in FIGS. 7A-7B.

In a first set of embodiments of the filters, honeycomb bodies, and honeycomb structures disclosed herein, the cell walls (e.g., cell walls 403) extend in an axial direction (z-direction as shown in FIG. 4C), the walls being disposed in an x-y grid arrangement as viewed in cross-section in a plane perpendicular to the axial direction (See FIGS. 4A and 4B), the matrix comprising a first group of walls (e.g., first group of cell walls 403X) aligned parallel to the x-direction, and a second group of parallel walls (e.g., second group of walls 403Y) aligned parallel to the y-direction, wherein the x-direction is orthogonal to the y-direction.

In some of the first set of embodiments, all of the walls at a given x location in the matrix are interconnected to form a first straight line of walls that may extend entirely across the honeycomb filter body, and only a fraction of the walls at a given y location are interconnected to form a second straight line of walls orthogonal in direction to the first straight line of walls, i.e., they are partial walls. In some of the first set of embodiments, the walls corresponding to at least 3 consecutive cells interconnect end-to-end to form a first straight line of a plurality of walls, and only a fraction of the walls at a given y location interconnect to form a second straight line of a plurality of walls. In some of the first set of embodiments, all of the walls at a given x location are interconnected to form a first straight line of walls, and only a fraction of the walls at a given y location are interconnected to form a second straight line of walls, i.e., they are partial walls. In some of the first set of embodiments, a plurality of the walls at a given x location in the matrix are interconnected to form a first straight line. In some of the first set of embodiments, at a plurality of y locations in the x-y grid and for a given x location in the x-y grid, a plurality of the walls at the y locations in the matrix are interconnected to form straight lines. In some of the first set of embodiments, not all the walls that extend in the x-direction at a selected y-location in the matrix are disposed end-to-end in a straight line, i.e., they are partial walls. In some of the first set of embodiments, some of the walls that extend in the x-direction at a selected y-location in the matrix are disposed end-to-end in a straight line.

In a second set of embodiments of the filters, honeycomb bodies, and honeycomb substrates disclosed, the matrix of porous cell walls extends in an axial direction, the matrix comprising a first group of parallel walls, and a second group of parallel walls which are oriented orthogonally with respect to the walls of the first group as viewed in a plane perpendicular to the axial direction. In some of these embodiments, the walls of the first group are interconnected continuously across the entire width of the matrix of walls of the honeycomb body; in some of these embodiments, the walls of the second group are not continuously interconnected across the entire width of the matrix of walls of the honeycomb body, i.e., they are partial walls.

In some embodiments of the filters, honeycomb bodies, and honeycomb structures disclosed herein, the inlet channels and the outlet channels axially extend parallel to one another.

In some embodiments of the filters, honeycomb bodies, and honeycomb structures disclosed herein, the inlet cells and the outlet cells extend in axial parallel arrangement to one another.

In some embodiments of the filters, honeycomb bodies, and honeycomb structures disclosed herein, the inlet channels (as well as the corresponding inlet cells) have a polygonal cross-sectional shape in a plane perpendicular to the axial direction. In some of these embodiments, at least one vertex of the polygonal cross-sectional shape comprises a rounded portion; in other embodiments, at least one vertex of the polygonal cross-sectional shape comprises a beveled portion as is shown in FIGS. 6C and 6D. In some embodiments, the outlet channels (or outlet cells) have a polygonal cross-sectional shape in a plane perpendicular to the axial direction; in some of these embodiments at least one vertex of the polygonal cross-sectional shape comprises a rounded portion (e.g., a radius), and in other embodiments at least one vertex of the polygonal cross-sectional shape comprises a beveled portion (a chamfer) as is shown in FIGS. 6C and 6D.

In some embodiments of the filters, honeycomb bodies, and honeycomb structures, the at least some of the inlet channels, or inlet cells of the inlet channels, have a square cross-sectional shape in a plane perpendicular to the axial direction z. In some embodiments of the filters, honeycomb bodies, and honeycomb structures, at least some of the outlet channels, or the outlet cells of the outlet channels, have a rectangular cross-sectional shape in a plane perpendicular to the axial direction.

In some embodiments of the filters and honeycomb structures disclosed herein, at least some of the inlet channels, or the inlet cells of the inlet channels, have a square cross-sectional shape in a plane perpendicular to the axial direction, and at least some of outlet channels, or the outlet cells of the outlet channels, have a rectangular cross-sectional shape in a plane perpendicular to the axial direction. For example, for some repeating structural units (e.g., repeating structural units 400U, 500U, and 900U-1600U), one of the cells of the repeating structural unit may be an outlet cell having a rectangular cross-sectional shape (e.g., outlet cells 402, 502, and 902-1602) and 3 or more cells may be inlet cells having a square cross-sectional shape (including 3, 4, 5, 6, 7, 8, 9, and 10 inlet cells).

In some embodiments of the filters, honeycomb bodies, and honeycomb structures disclosed herein, there are 3 or more times as many inlet channels (or inlet cells) as outlet channels (or outlet cells), i.e., the I/O ratio is greater than or equal to 3/1, including greater than or equal to 4/1, greater than or equal to 5/1, greater than or equal to 6/1, greater than or equal to 7/1, greater than or equal to 8/1, or even greater than or equal to 9/1.

In some embodiments of the filters, honeycomb bodies, and honeycomb structures disclosed herein, an inlet open frontal area of the honeycomb structure (OFAin) comprises the sum of the areas of the inlet channels in a plane perpendicular to the axial direction, and an outlet open frontal area of the honeycomb structure (OFAout) comprises the sum of the areas of the outlet channels in a plane perpendicular to the axial direction, and wherein OFAin>OFAout. In some of these embodiments, a ratio of OFAin:OFAout is between 1.5 and 5.0. In some embodiments, a product of the ratio OFAin:OFAout and the average fraction of the perimeter of inlet cells or channels sharing a wall with outlet cells or channels is at least 0.67 but less than 1.0.

In some or all of the embodiments of the filters, honeycomb bodies, and honeycomb structures disclosed herein, all of the porous cell walls (e.g., porous cell 403-1603) in the matrix have the same thickness. The wall thickness may range from about 0.10 mm to about 0.41 mm, for example. Other wall thicknesses are possible.

In some or all of the embodiments of the filters, honeycomb bodies, and honeycomb structures disclosed herein, all of the porous cell walls (e.g., cell walls 403-1603) in the matrix have the same average thickness.

In some embodiments of the filters, honeycomb bodies, and honeycomb structures disclosed herein, one or more inlet channels are disposed between any two outlet channels in the matrix; in some embodiments, each outlet channel is spaced away from any other outlet channel by one or more inlet channels.

Figure 20:
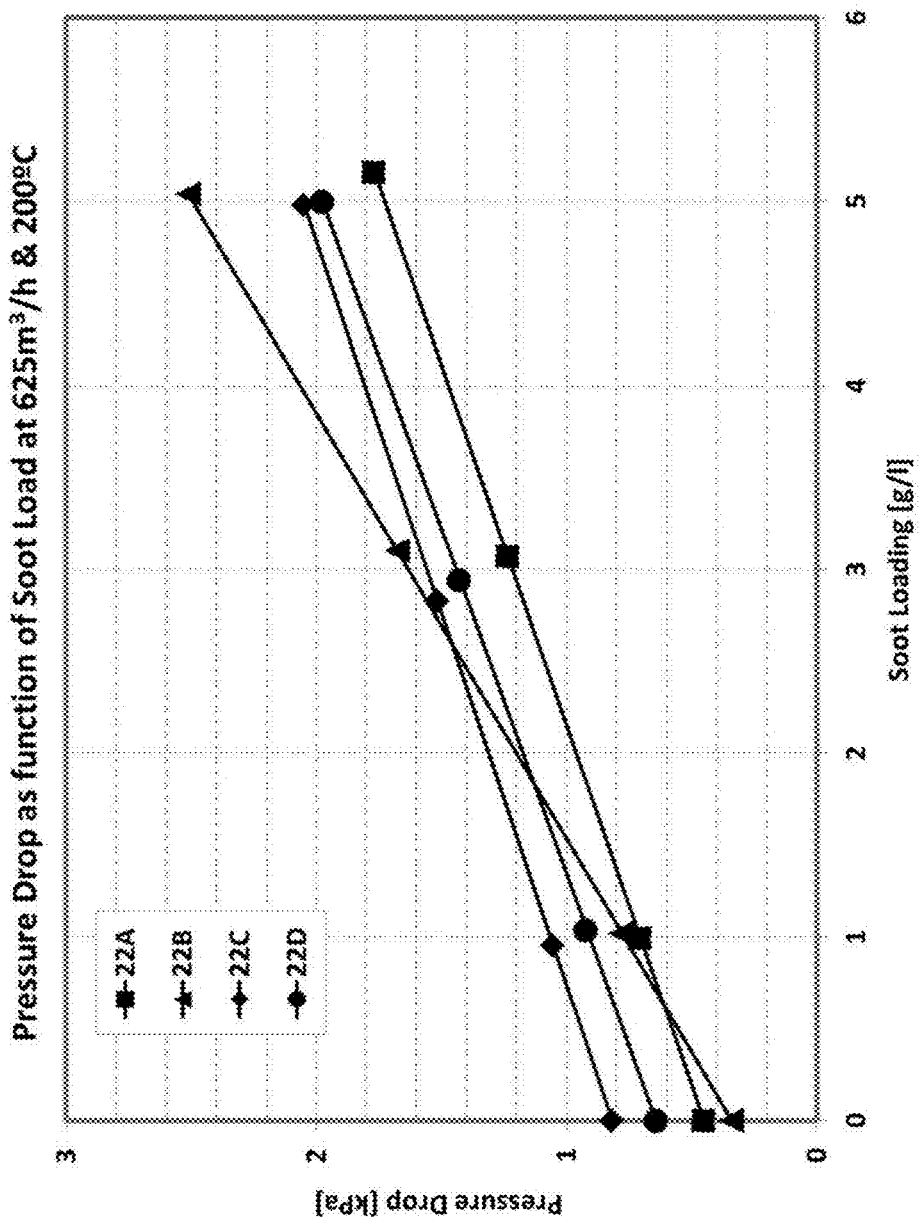
FIG. 20 graphically shows soot-loaded pressure drop as a function of soot load at 625 m³/h and 200° C. for the plugged honeycomb bodies of FIGS. 22A, 22B, 22C, 22D.

In some embodiments of the filters, honeycomb bodies, and honeycomb structures disclosed herein, the cell walls comprise a plurality of first walls and a plurality of second walls, wherein the first walls have a first average thickness and the second walls have a second average thickness, and the second average thickness is greater than the first average thickness (See FIGS. 20A-20C). The second average thickness may be 20% greater than the first average thickness, or even more than 20%, for example.

In some embodiments of the filters, honeycomb bodies, and honeycomb structures disclosed herein, the matrix comprises a plurality of repeating unit blocks, each unit block comprising a group of cells defining at least one outlet channel and a plurality of surrounding inlet channels adjacent and abutting at least one the outlet channel of the repeating unit block.

In some embodiments of the filters, honeycomb bodies, and honeycomb structures disclosed herein, the honeycomb structure comprises a plurality of repeating structural units (e.g., repeating structural units 400U-1600U), each unit comprising a group of interconnected walls defining a respective outlet cell, or outlet channel, and a plurality of surrounding or abutting inlet cells, or surrounding or abutting inlet channels, adjacent the respective outlet channel or outlet cell. In some embodiments, the honeycomb structure comprises a portion comprising a first plurality of first repeating structural units, and another portion which is either free of repeating structural units or which comprises a plurality of second repeating structural units wherein the first and second repeating structural units differ. In some embodiments, the honeycomb structure can comprise a portion consisting of square cells, which in some embodiments such portion consists of square cells which are of the same size or substantially similar size to each other. For example, In some of these embodiments, each repeating structural unit comprises walls extending in an axial direction (z-direction), the walls comprised of a first group of side walls aligned parallel to a first direction and a second group of side walls aligned parallel to a second direction, wherein the first direction is orthogonal to the second direction, and the first and second directions are each orthogonal to the axial direction (e.g., direction z). In some embodiments, each repeating structural unit (e.g., repeating structural units 400U-1600U), comprises: an outlet-defining set of walls comprised of a first set of the walls of the first group interconnected with a second set of the walls of the second group to collectively define a corresponding outlet channel, or outlet cell, in the repeating structural unit, the outlet cell or channel having a plurality of corners, and at least one wall, other than the outlet-defining set of walls which interconnects with a T-intersection with one of the outlet-defining set of walls at an intermediate location (e.g., half way) between corners of the corresponding outlet channel or cell. In some of these embodiments, each repeating structural unit (e.g., repeating structural units 400U-1600U), comprises: an outlet-defining set of walls comprised of a first set of the walls of the first group interconnected with a second set of the walls of the second group to collectively define a corresponding outlet channel, or outlet cell, in the repeating structural unit, the outlet cell or outlet channel having a plurality of corners, and at least one wall, other than the outlet-defining set of walls which interconnects with one of the outlet-defining set of walls at a location spaced away from the corners of the corresponding outlet channel, or outlet cell.

In some embodiments, the repeating structural unit (e.g., repeating structural units 400U-1600U), comprises a plurality of inlet channels or inlet cells. In some embodiments, at least one of the walls in the repeating structural unit is shared by one of the inlet cells and one of the outlet cells in the repeating structural unit. In some embodiments, a plurality of the walls in the repeating structural unit are shared by at least one inlet cell and at least one outlet cell. In some of these embodiments, at least one of the inlet channels shares one of the outlet-defining set of walls with the corresponding outlet channel or outlet cell. In some embodiments, each of a plurality of the inlet cells or channels shares one of the outlet-defining set of walls with the corresponding outlet cell or channel.

In some embodiments, the repeating structural unit (e.g., repeating structural units 600U-800U), comprises a plurality of outlet channels or cells; in some of these embodiments (e.g., repeating structural units 700U), the repeating structural unit comprises at least two outlet cells, or outlet channels, having differing cross-sectional areas, or hydraulic diameters. In some embodiments, a sidewall of the first group interconnects with a sidewall of the second group. In some embodiments, sidewalls of the first group interconnect with a sidewall of the second group.

In some embodiments of the filters, honeycomb bodies, and honeycomb structures disclosed herein, the walls are disposed in an x-y grid arrangement as viewed in a plane perpendicular to the axial direction (z-direction), the array of walls comprising a first group of walls (e.g., 403X-1603X) aligned parallel to the x-direction, and a second group of parallel walls (e.g., 403Y-1603Y) aligned parallel to the y-direction, wherein the x-direction is orthogonal to the y-direction.

In some embodiments of the filters, honeycomb bodies, and honeycomb structures disclosed herein, the matrix comprises a plurality of repeating channel units, each channel unit comprising a respective outlet channel and a plurality of surrounding or abutting inlet channels adjacent the respective outlet channel. In some embodiments, the plurality of surrounding or abutting inlet channels is defined by a plurality of shared sidewall inlet cells. In some embodiments, the plurality of surrounding or abutting inlet channels is defined by a plurality of shared corner portion inlet cells. In some embodiments, the plurality of surrounding or abutting inlet channels is defined by a plurality of shared sidewall inlet cells, or a plurality of shared corner portion inlet cells, or both. In some embodiments, a respective one of the cell walls is disposed between each shared sidewall inlet cell and a respective adjacent outlet cell. In some embodiments, each of the inlet cells surrounds a respective outlet cell in its respective repeating unit, wherein the respective shared walls of the repeating unit are disposed between the outlet cell and each of the inlet cells.

In some embodiments of the filters, honeycomb bodies, and honeycomb structures disclosed herein, each of the outlet cells, or outlet channels, is completely surrounded by inlet cells, or inlet channels.

In some embodiments of the filters, honeycomb bodies, and honeycomb structures disclosed herein, no outlet channel in the matrix is adjacent to another outlet channel.

In some embodiments of the filters, honeycomb bodies, and honeycomb structures disclosed herein, no outlet cell in the array of cells is adjacent to another outlet cell.

In some embodiments of the filters, honeycomb bodies, and honeycomb structures disclosed herein, each of the inlet channels in at least one repeating structural unit are of equal cross-sectional shape and size. In some embodiments of the filters and honeycomb structures disclosed herein, each of the inlet cells in at least one repeating structural unit are of equal cross-sectional shape and/or size.

In some embodiments of the filters, honeycomb bodies, and honeycomb structures disclosed herein, all of the inlet channels are of equal cross-sectional shape and/or size (excluding partial channels intersecting with the skin). In some embodiments of the filters, honeycomb bodies, and honeycomb structures disclosed herein, each of the inlet cells are of equal cross-sectional shape and/or size (excluding partial channels intersecting with the skin).

In some embodiments of the filters, honeycomb bodies, and honeycomb structures disclosed herein, all of the inlet channels in at least one repeating structural unit are of equal cross-sectional shape and/or size.

In some embodiments of the filters, honeycomb bodies, and honeycomb structures disclosed herein, the walls extend axially between an inlet end and an outlet end of the honeycomb structure.

In some embodiments of the filters, honeycomb bodies, and honeycomb structures disclosed herein, all of the walls in the matrix have the same thickness at an axial location disposed between the inlet end and the outlet end.

In some embodiments of the filters, honeycomb bodies, and honeycomb structures disclosed herein, at least a majority of the inlet channels are plugged at or near the outlet end.

In some embodiments of the filters, honeycomb bodies, and honeycomb structures disclosed herein, at least a majority of the outlet channels are plugged at or near the inlet end.

Figure 16C:
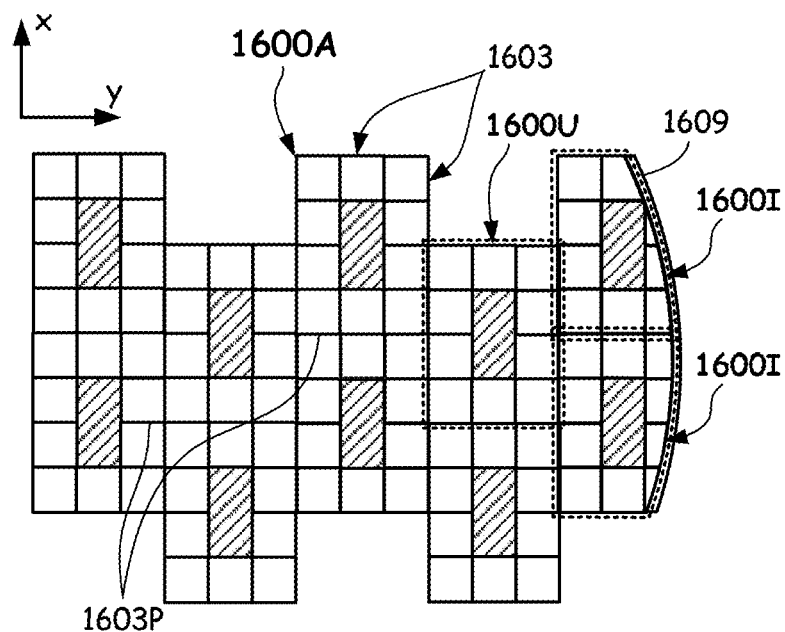
FIG. 16C illustrates a plugged honeycomb structure of a particulate filter wherein less than all the honeycomb structure comprises a structural repeating unit according to one or more embodiments of the disclosure.
Figure 16D:
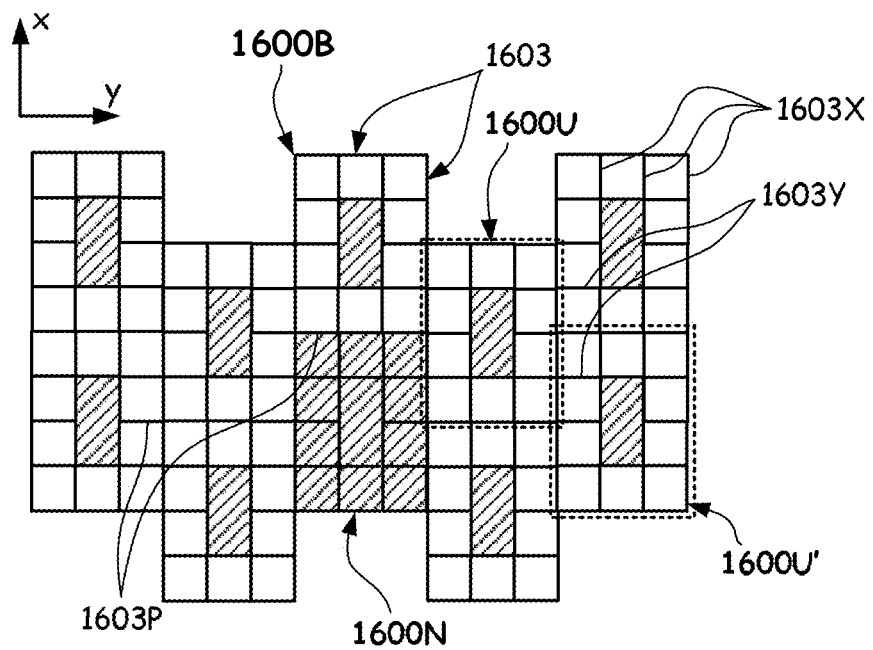
FIG. 16D illustrates an alternative embodiment plugged honeycomb structure of a particulate filter wherein less than all the honeycomb structure includes a structural repeating unit according to one or more embodiments of the disclosure.

In some embodiments, the honeycomb structure comprises one or more portions comprising repeating structural units, and one or more portions not comprising repeating structural units, and in particular embodiments one or more portions free of repeating structural units comprising a non-square rectangular cell. For example, as shown in partial view in FIGS. 16C-16D, some portions that may not constitute the presence of repeating structural units 1600U could comprise inlet channels and outlet channels, or blocked channels, which may be present in one or more locations in the honeycomb structure such as at or near the outer periphery, or at the centerline, or at other select locations throughout the honeycomb structure. For example, the one or more portions not comprising repeating structural units 1600U may be incomplete units 1600I having part of the shape of a repeating structural units 1600U that are located at the outer periphery adjacent to the skin 1609 as shown in FIG. 16C. In FIG. 16D, the one or more portions not comprising repeating structural units 1600U may be a group of blocked cells 1600N (e.g., outlet and/and inlet cells) that are located within the honeycomb structure 1600B, but do not have the same plugging pattern as the repeating structural units 1600U. Such a group of blocked cells 1600N may be located at or near the outer periphery, or at the centerline, or at other select locations of the honeycomb body. In some embodiments, the honeycomb structure comprises more than one distinct such group. In some embodiments, the honeycomb structure comprises one or more portions comprising first repeating structural units, and one or more portions comprising second repeating structural units, wherein the first and second repeating structural units differ from one another.

In one set of embodiments disclosed herein, particulate wall flow filters (e.g., diesel and/or gas particulate wall flow filters) comprise a honeycomb body with a honeycomb structure comprising: OFAin is greater than OFAout, and the ratio OFAin:OFAout that is between 1.5 and 5.0 (including 1.5, 2.0, 2.5, 3.0, 3.5, 4.0, 4.5, and 5.0); ratio of the area of inlet cells, or inlet channels, to area of the outlet cells, or outlet channels. In some embodiments, the ratio OFAin:OFAout is greater than 2, or even greater than 3, all inlet cells and their inlet channels may be of equal cross-sectional shape and size. In some embodiments, at least some of the outlet cells and their channels have a larger hydraulic diameter than any of the inlet cells or channels. In some embodiments, the product of the ratio OFAin:OFAout and the average fraction of the perimeter of inlet cells sharing a wall with outlet cells is at least 0.67 but less than 1.0. In some embodiments, the honeycomb structure is comprised of walls disposed such that inlet cells define square inlet channels and outlet cells define rectangular outlet channels. In some embodiments, for a particular repeating structural unit of the honeycomb structure, a cross-sectional area of at least one of the outlet cells is twice that of at least one of the inlet cells. In some embodiments, the cross-sectional area of any of the outlet cells is twice that of any of the inlet cells. In some embodiments, the web thickness, or thickness of the walls of the honeycomb structure that define the channels are of constant or substantially constant wall thickness; in other embodiments, the honeycomb structure comprises non-equal web thicknesses (or wall thicknesses), such as to provide enhanced isostatic strength.

Example embodiments of the honeycomb structures 400-1600 of the present disclosure can in some instances comprise a relatively high level of open and interconnected total porosity. For example, honeycomb structures 400-1600 comprising a total porosity, % P, of at least 35%, at least 40%, at least 45%, at least 50%, or even at least 60%, as determined by mercury porosimetry, can be provided.

In addition to the relatively high total porosities, the honeycomb structures 400-1600 of the present disclosure can also comprise median pore diameter, $d_{50}$, of the pores of at least 8 µm, of at least 10 µm, or even of at least 12 µm. Further, the median pore diameter, $d_{50}$, of the pores may not exceed 30 µm, may not exceed 25 µm, and in some embodiments may not exceed 20 µm. In still another embodiment, the median pore diameter, $d_{50}$, of the pores can be in the range of from 8 µm to 30 µm, from 10 µm to 25 µm, from 12 µm to 20 µm, or even from 12 µm to 18 µm.

In addition to the relatively high total porosities and specified median pore sizes, the honeycomb structures 400-1600 of the present disclosure can also comprise a relatively narrow pore size distribution as evidenced by a minimized percentage of relatively fine and/or relatively coarse pores. To this end, pore size distributions can be expressed by a pore fraction. For example, the quantity $d_{50}$ represents the median pore size based upon pore volume, and is the pore diameter at which 50% of the open porosity of the ceramic structure has been intruded by mercury. The quantity $d_{90}$ is the pore diameter at which 90% of the pore volume is comprised of pores whose diameters are smaller than the value of $d_{90}$; thus, $d_{90}$ is also equal to the pore diameter at which 10% by volume of the open porosity of the ceramic structure has been intruded by mercury. Still further, the quantity $d_{10}$ is the pore diameter at which 10% of the pore volume is comprised of pores whose diameters are smaller than the value of $d_{10}$; thus, $d_{10}$ is equal to the pore diameter at which 90% by volume of the open porosity of the ceramic structure has been intruded by mercury. The values of $d_{10}$ and $d_{90}$ are expressed in units of micrometers.

The relatively narrow pore size distribution of the exemplary embodiments of the honeycomb structures 400-1600 can, in one embodiment, be evidenced by the width of the distribution of pore sizes finer than the median pore size, $d_{50}$, further quantified as pore fraction. As used herein, the width of the distribution of pore sizes finer than the median pore size, $d_{50}$, are represented by a "$d_{factor}$" or "$d_f$" value which expresses the quantity $(d_{50}-d_{10})/d_{50}$. To this end, the ceramic honeycomb structures of the present disclosure can comprise a $d_f$ value of less than 0.50, less than 0.40, less than 0.35, or even less than 0.30. In some embodiments, the $d_f$ value of the disclosed honeycomb structure is less than 0.25, or even less than 0.20. To this end, a relatively low value of $d_f$ indicates a low fraction of fine pores, and low values of $d_f$ can be beneficial for improving low soot-loaded pressure drop when the honeycomb structures 400-1600 are utilized in filtration applications, such as for diesel or uas particulate filters.

Relatively narrow pore size distribution of the disclosed honeycomb structures 400-1600 can optionally or additionally, in some embodiments, be evidenced by the width of the distribution of pore sizes that are finer or coarser than the median pore size, $d_{50}$, further quantified as a pore fraction. As used herein, the width of the distribution of pore sizes that are finer or coarser than the median pore size, $d_{50}$, are represented by a "$d_{Breadth}$" or "$d_B$" value which expresses the quantity $(d_{90}-d_{10})/d_{50}$. To this end, the honeycomb structures 400-1600 of the present disclosure in some embodiments, may comprise a $d_B$ value that is less than 1.50, less than 1.25, less than 1.10, or even less than 1.00. In some example embodiments, the value of $d_B$ is less than 0.8, less than 0.7, or even less than 0.6. A relatively low value of $d_B$ can provide a relatively higher filtration efficiency as well as and higher strength in honeycomb structures used to filter particulates from exhaust flows for diesel and/or gas combustion engines.

To this end, a combination of the aforementioned porosity values, median pore diameter values, and either $d_f$ or $d_B$ can aid in providing low clean and soot-loaded pressure drop while maintaining useful filtration efficiency when the ceramic honeycomb bodies of the present disclosure are used in diesel or gas exhaust filtration applications.

Further, one or more embodiments of the honeycomb structures 400-1600 described herein may exhibit a low coefficient of thermal expansion resulting in excellent thermal shock resistance (TSR). As will be appreciated, TSR is inversely proportional to the coefficient of thermal expansion (CTE). That is, a honeycomb structure with low thermal expansion will typically have higher thermal shock resistance and can survive the wide temperature fluctuations that are encountered in, for example, diesel or gas exhaust filtration applications. Accordingly, in one or more embodiments, the honeycomb structures 400-1600 may be characterized by having a relatively low coefficient of thermal expansion (CTE) in at least one direction and as measured by dilatometry, that is less than or equal to about $25.0 \times 10^{-7}/°$ C., less than or equal to $20.0 \times 10^{-7}/°$ C.; less than or equal to $15.0 \times 10^{-7}/°$ C.; less than or equal to $10.0 \times 10^{-7}/°$ C.; or even less than or equal to $8.0 \times 10^{-7}/°$ C., across the temperature range of from 25° C. to 1000° C.

Still further, it should be understood that embodiments of the above-described honeycomb structures 400-1600 can exhibit any desired combination of the aforementioned properties. For example, in some embodiments, CTE (25-1000° C.) is less than or equal to $12 \times 10^{-7}/°$ C. (or even is less than or equal to $10 \times 10^{-7}/°$ C.), the porosity % P is at least 40% or even at least 45%, the median pore diameter is at least 10 μm (or at least 12 μm), and the value of $d_f$ is less than 0.35 (or even less than 0.30). In some embodiments, $d_B$ may be less than 1.0, less than 0.85, or even less than 0.75. The honeycomb bodies of the present disclosure can have any shape or geometry suitable for a particular application, such as round (See FIGS. 4D-4E) Other outer peripheral shapes such as oval, racetrack, square, rectangular, triangular, octagonal, hexagonal, or the like can be used. The honeycomb structure 400-1600 can further have cellular densities from about 70 cells/in$^2$ (10.9 cells/cm$^2$) to about 400 cells/in$^2$ (62 cells/cm$^2$). Other cell densities may be used. The length of the honeycomb bodies may be any suitable length for the application. In some embodiments, the honeycomb bodies made up of the honeycomb structures 1600 may be rectangular or hexagonal in outer cross-sectional shape and may be adhered together, such as with suitable cement mixture, to form a larger honeycomb body (a so-called segmented structure).

In some embodiments disclosed herein, the particulate wall flow filters comprising the honeycomb structure described herein provides very high ash storage volume for practically maintenance-free particulate wall flow filter use over the lifetime of a vehicle, and provides reduced pressure drop, compared to other known designs.

Preferably, extrusion dies used to produce the various honeycomb structures and honeycomb bodies for the particulate wall flow filters can be produced with a minimum of plunge EDM manufacturing processes, or even no plunge EDM steps (such as provided by, for example, wire EDM techniques), thereby tremendously reducing the extrusion die manufacturing costs. In some embodiments, divots or plenums may be added to some, most, or all of the pins on die designs of this type.

In some embodiments disclosed herein, a porous ceramic wall-flow particulate filter comprises a plugged, wall-flow honeycomb filter body comprised primarily of a ceramic and having a plurality of longitudinal cell walls defining a plurality of cell channels extending from an inlet end to an outlet end of the body, wherein at least some of the cell channels are plugged, such as at the inlet end, or at the outlet end, between the inlet and outlet ends, or a combination thereof. The porous ceramic filter may be formed from a suitable ceramic-forming batch mixture that is extruded through an extrusion die to form a green body comprised of a matrix of intersecting walls, such as a honeycomb structure, wherein the green body is dried and fired to form a ceramic structure. In some embodiments, the ceramic may be comprised of a cordierite crystalline phase, or primarily of cordierite and optionally comprising other minor crystalline phases. In some embodiments a ceramic wall-flow particulate filter is formed with plugs disposed in at least some of the channels at one end (e.g., an inlet end), or at least some of the channels at the opposite end (e.g., outlet end), such as shown plugged on each end face in the patterns described herein. The ceramic wall-flow particulate filter can be designed to be coated such as with a washcoat, but could alternatively be utilized as a bare (uncoated) filter. In some embodiments, the wall-flow honeycomb filter body and honeycomb structure (e.g., honeycomb structures 400-1600) may be comprised primarily of cordierite, cordierite magnesium aluminum titanate, mullite, aluminum titanate, silicon carbide, alumina, or other suitable ceramic materials exhibiting open interconnected porosity. In some embodiments disclosed herein, the porous ceramic wall-flow particulate filter and honeycomb body comprises a honeycomb structure comprising a plurality of intersecting walls defining parallel channels extending in an axial direction between an inlet end and an outlet end.

Embodiments of the present disclosure may be used as, for example, a diesel particulate filter or a gas particulate filter to filter exhaust streams emanating from diesel or gas combustion engines.

Depicted in FIG. 17C are inlet side and outlet side views, respectively, of a ceramic body for use in a particulate wall-flow filter according to one or more embodiments described herein. The honeycomb structure 500 of the honeycomb body shown is the same as is described in FIGS. 5A-5B herein. However, any of the other honeycomb structures (e.g., honeycomb structures 400 and 600-1600) described herein may be substituted. The ceramic body may generally have a honeycomb structure 500 comprising a matrix of intersecting cell walls 503 defining parallel channels extending in an axial direction (e.g., z direction) between an inlet end and an outlet end and may comprise any suitable ceramic material such as described above.

EXAMPLES

Various honeycomb bodies (e.g., plugged honeycomb structure bodies) including various honeycomb structures were fabricated, namely 2" diameter×6" axial length parts were produced of porous aluminum titanate and tested in order to compare the pressure drop of designs disclosed herein versus comparative designs. Three different honeycomb structures were evaluated: FIG. 17A) an asymmetric honeycomb structure similar to that shown in FIGS. 2A and 2B with a geometry of 300 cells per square inch, cell wall thickness of 7 mils (aka "300/7 geometry"), and an inlet-to-outlet cross-sectional area ratio of 1.7:1; FIG. 17B) an asymmetric honeycomb structure similar to that shown in FIGS. 2A and 2B with a geometry of 400 cells per square inch, cell wall thickness of 7 mils (aka "400/7 geometry"), and an inlet-to-outlet cross-sectional area ratio of 2.2:1; and FIG. 17C) a honeycomb structure 500 similar to that shown in FIGS. 5A and 5B with a geometry of 400 cells per square inch, cell wall thickness of 8 mils (aka "400/8 geometry"), and an inlet to outlet cross-sectional area ratio of 2.2:1.

Figure 18B:
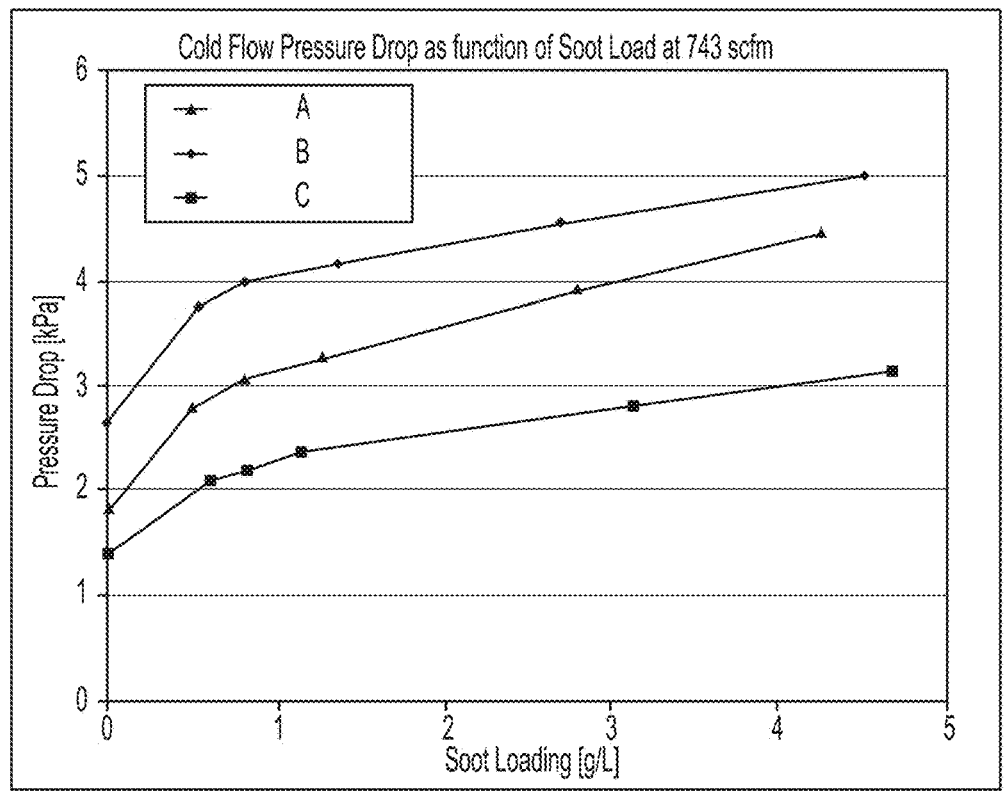
FIG. 18B schematically depicts soot-loaded pressure drop as a function of soot load at 743 scfm cold flow for the structures of FIGS. 17A, 17B, and 17C.
Figure 18C:
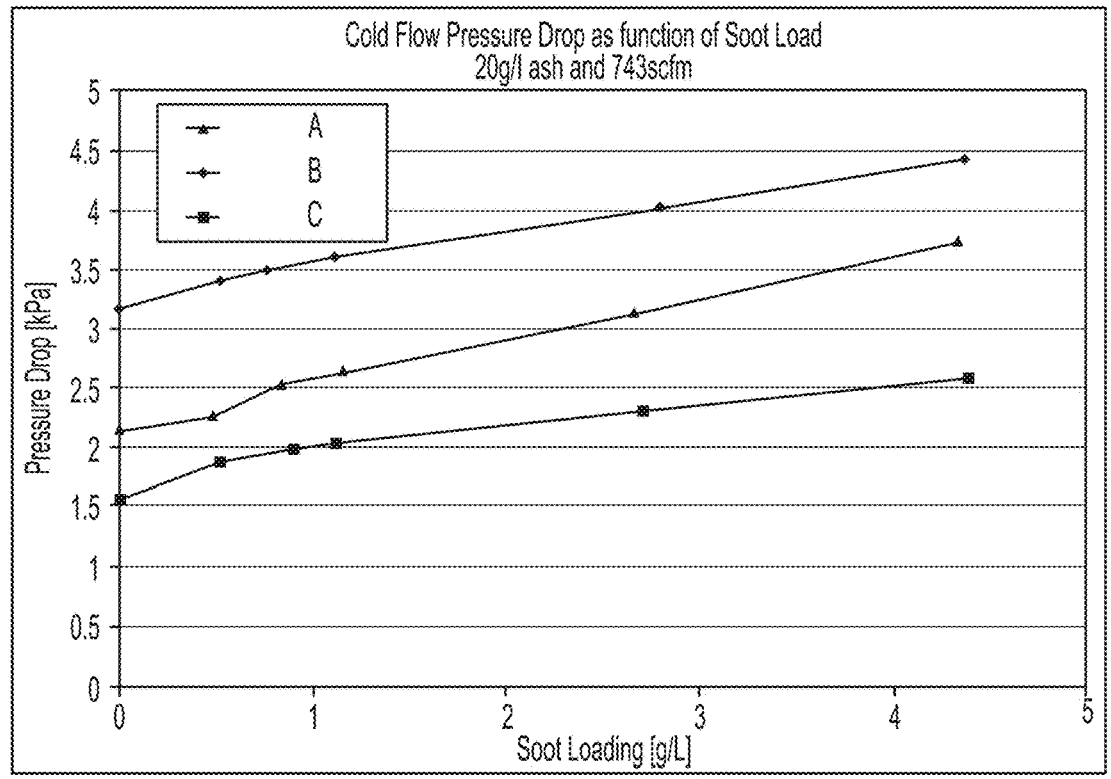
FIG. 18C schematically depicts ash-loaded pressure drop as a function of soot load at 743 scfm cold flow for the structures of FIGS. 17A, 17B, and 17C, at an ash load of 20 g/liter ash.

FIGS. 17A-17C shows photographs of the plugged inlet ends (upper picture) and outlet ends (lower picture) of the representative parts of the three designs (A, B, C), respectively, wherein design A is shown in FIG. 17A, design B is shown in FIG. 17B, and design C (a presently disclosed design) is shown in FIG. 17C. The plugged honeycomb parts of designs A, B, and C were tested for cold pressure drop as a function of flow rate (see FIG. 18A), and were then loaded with printex soot and retested for soot loaded pressure drop at various levels up to about 5 g/l (see FIG. 18B). After soot loaded pressure drop values were recorded, the soot was burned out and the parts were loaded with ash material obtained from a filter removed from a truck, at a level of 20 g/l. Pressure drop testing was again performed as a function of soot loading and the results are shown in FIG. 19C.

As can be seen from the pressure drop testing illustrated in the Figures, the honeycomb structure of design C as disclosed herein offers a distinct advantage in terms of pressure drop performance for a given ash storage capacity over, for example, designs A and B. The high ash storage capacity of designs A and B are disadvantaged in pressure drop due to the relatively small hydraulic diameter of the outlet channels. The embodiments disclosed herein can thus provide a pressure drop advantage in the clean and soot-loaded states over known designs.

Various embodiments of honeycomb bodies (plugged honeycomb structure bodies) were fabricated, for example 10.5" diameter×7.5" axial length bodies were made of porous cordierite and tested to evaluate the pressure drop performances. For example, four honeycomb structures were evaluated: FIG. 22A) shows Sample 22A having an asymmetric honeycomb structure similar to that shown in FIGS. 2A and 2B with a geometry of 300 cells per square inch, cell wall thickness of 7 mils ("300/7 geometry"), and an inlet-to-outlet cross-sectional area ratio of 1.7:1; FIG. 22B) shows Sample 22B having a symmetric honeycomb structure similar to that shown in FIGS. 1A and 1B with a geometry of 200 cells per square inch, cell wall thickness of 8 mils ("200/8 geometry"), and an inlet-to-outlet cross-sectional area ratio of 1:1; FIG. 22C) shows Sample 22C having a honeycomb structure 500 similar to that shown in FIGS. 5C and 5D with a geometry of 400 cells per square inch, cell wall thickness of 8 mils ("400/8 geometry"), and an inlet to outlet cross-sectional area ratio of 1.8:1; and FIG. 22D) shows sample 22D having a honeycomb structure 500 similar to that shown in FIGS. 5C and 5D with a geometry of 300 cells per square inch, cell wall thickness of 8 mils ("300/8 geometry"), and an inlet to outlet cross-sectional area ratio of 1.9:1.

FIGS. 22A-22D shows photographs of the plugged inlet ends (upper picture) and outlet ends (lower picture) of the representative parts of the four designs (A, B, C, D), respectively, wherein design 22A is shown in FIG. 22A, design 22B is shown in FIG. 22B, design 22C (a presently disclosed design) is shown in FIG. 22C, design 22D is shown in FIG. 22D. The plugged honeycomb parts of designs 22A, 22B, 22C, and 22D were tested for pressure drop as a function of soot load, results shown graphically in FIG. 23, on a test rig up-fitted with a diesel fired burner used for generating soot and a blower supplying air to control temperature and flow into the tested honeycomb parts. The parts were loaded with soot generated from the above mentioned test rig for determining soot loaded pressure drop at various levels up to about 5 g/l.

Figure 23:
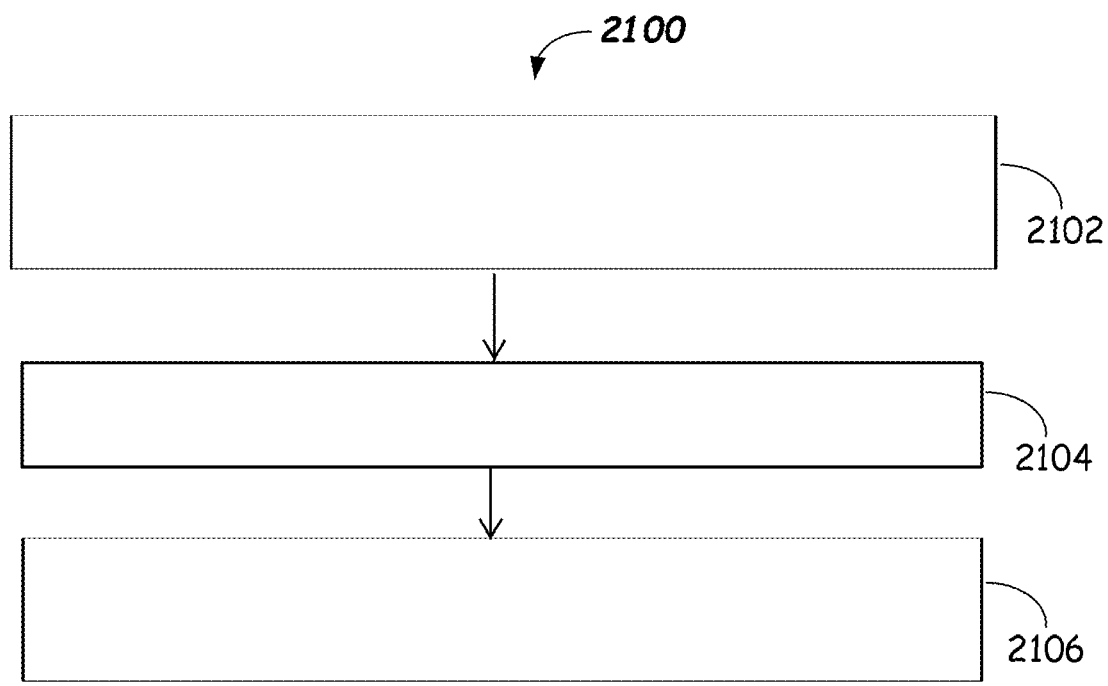
FIG. 23 illustrates a flowchart of a method of manufacturing a honeycomb structure according to one or more embodiments.

As seen in FIG. 23, the honeycomb structures of designs 22C and 22D as disclosed herein provided improved soot loaded pressure drop performance over, for example, design 22B. The higher inlet to outlet cross-sectional area ratio of designs 22C and 22D would also result in a higher ash storage capacity over, for example, designs A and B and an end of life ash load of designs 22C and 22D would provide an advantage of soot loaded pressure drop over, for example, designs 22A and 22B. Note that high ash storage capacity of designs like 22A and 22B can result in higher pressure drop due to relatively small hydraulic diameter of the outlet channels. The embodiments disclosed herein can thus provide an improvement in pressure drop in soot and ash-loaded states over known designs.

Figure 24:
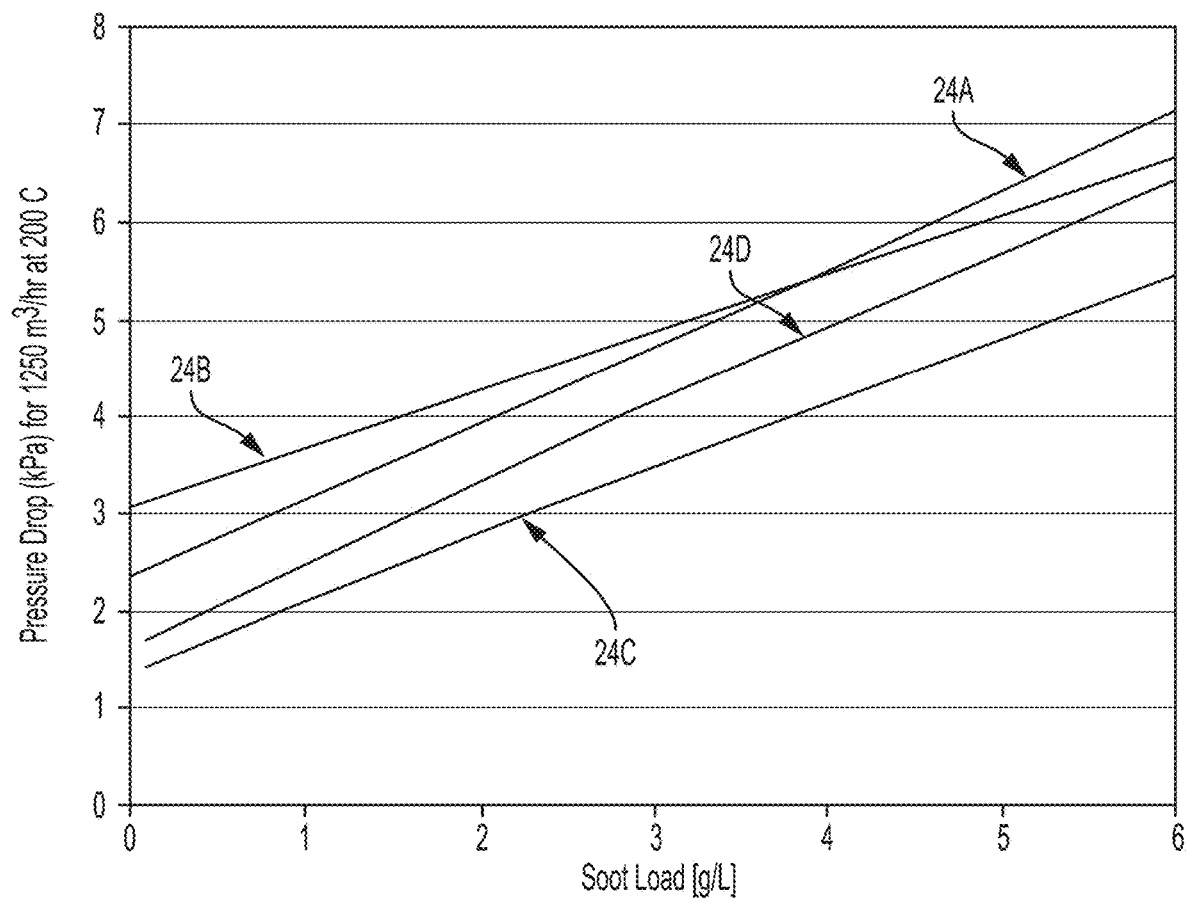
FIG. 24 shows modeled pressure drop performance of four different filter (plugged honeycomb body) designs for different soot loads, each plugged honeycomb structure having a diameter of 10.5 inches and length of 7.5 inches, cell density of 350 cells per square inch, honeycomb matrix wall thickness of 9.5 mils, wall porosity of 45% and wall median pore diameter of 14 micrometers.
Figure 25:
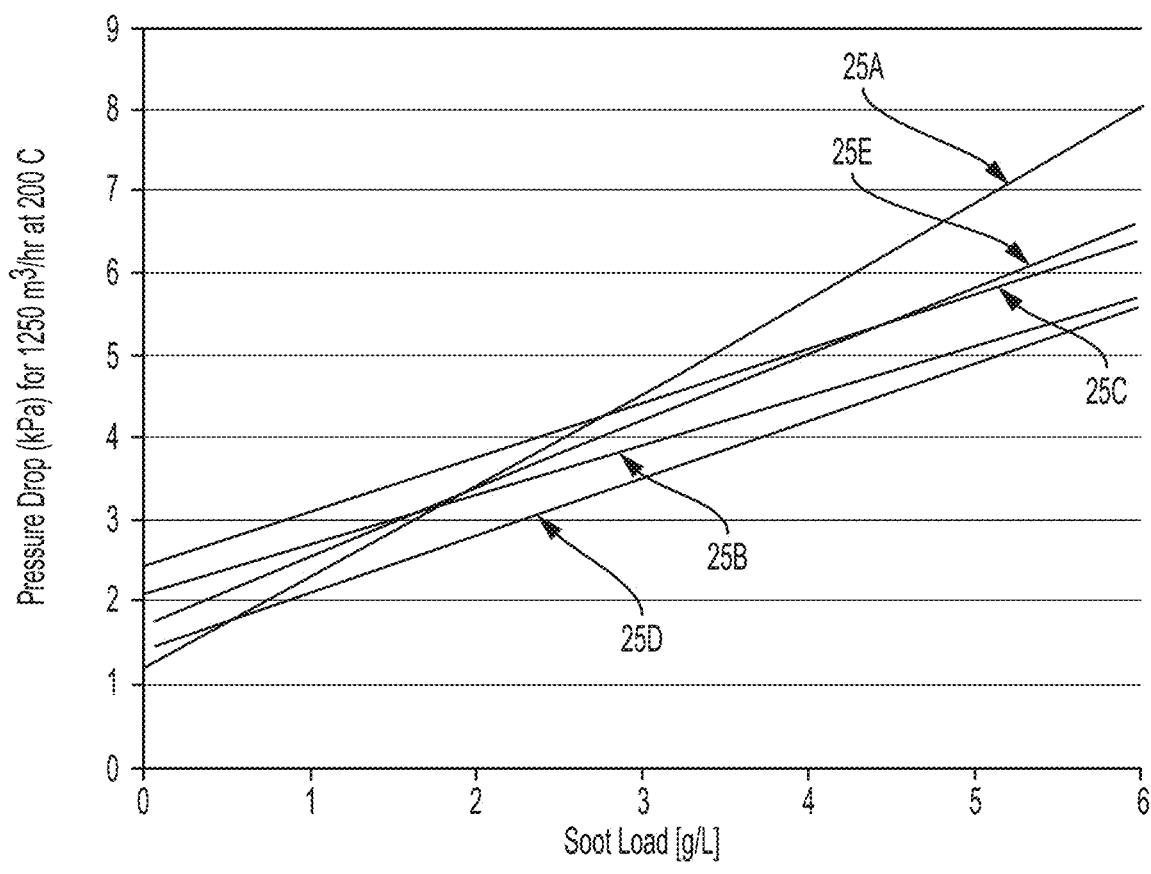
FIG. 25 shows the modeled pressure drop performance of four different filter designs for different soot loads, each plugged honeycomb structure having diameter of 10.5 inches and length of 7.5 inches, wall porosity of 55% and wall median pore diameter of 12 micrometers.

FIG. 23 also illustrates a difference between design 22C and design 22D in that the slope for the soot load vs.

pressure drop data for design 22D is greater than that of designs 22C and 22A. A higher slope for soot load vs. pressure drop can provide an improved ability to estimate filter soot load based on pressure drop, resulting in improved pressure drop based particulate filter diagnostics. Among the four designs tested, design 22B offers the highest slope for soot load vs. pressure drop but lacks in ash storage capacity compared to designs 22A, 22C, and 22D. Design 22D offers a greater slope for soot load vs. pressure drop as compared to design C as a result of the lower cell density (300 cells per square inch vs. 400 cells per square inch) although both designs have honeycomb structure 500 similar to that shown in FIGS. 5C and 5D. FIGS FIG. 24 shows modeled pressure drop performance of four different filter (plugged honeycomb body) designs having diameter of 10.5 inches and length of 7.5 inches, cell density of 350 cells per square inch, honeycomb matrix wall thickness of 9.5 mils, wall porosity (average porosity) of 45% and wall median pore diameter of 14 micrometers (microns). Incorporated into the pressure drop modeling was a thin ash layer that was inferred to exist in the filter which acts to stop soot particles from entering into the filter wall with the result that soot is present only within the channels and there is no contribution to pressure drop from deep bed filtration. The pressure drop was modeled at soot loadings of 0 g/L and 6 g/L, and therebetween, for an exhaust flow rate of 1250 m$^3$/hr and a gas temperature of 200 C. For a design 24A for a filter body with a known honeycomb structure as shown in FIGS. 1A and 1B, the pressure drop increased from 2.36 kPa at 0 g/L soot load to 7.15 kPa at 6 g/L corresponding to pressure drop vs. soot load slope of 0.798 kPa/(g/L of soot). For a design 24B for a filter body with a honeycomb structure with an asymmetric design as shown in FIGS. 2A and 2B the pressure drop increased from 3.06 kPa at 0 g/L soot load to 6.67 kPa at 6 g/L corresponding to pressure drop vs. soot load slope of 0.601 kPa/(g/L of soot). For a design 24C a filter body as disclosed herein with a honeycomb structure with an asymmetric design having outlet to inlet cross-sectional area ratio of 2:1 as shown in FIGS. 5A and 5B the pressure drop increased from 1.41 kPa at 0 g/L soot load to 5.44 kPa at 6 g/L corresponding to pressure drop vs. soot load slope of 0.671 kPa/(g/L of soot). For a design 24D for a filter body with a honeycomb structure with an asymmetric design as shown in FIGS. 10A and 10B and having outlet to inlet cross-sectional area ratio of 3:1 the pressure drop increased from 1.69 kPa at 0 g/L soot load to 6.41 kPa at 6 g/L corresponding to pressure drop vs. soot load slope of 0.786 kPa/(g/L of soot). The pressure drop performance can be quantified by a defined parameter $\Omega$ which is the ratio of the clean pressure drop (corresponding to the case of soot loading of 0 g/L) of an asymmetric design filter as disclosed herein to the clean pressure drop of a symmetric filter having similar CPSI, wall thickness, diameter, length and wall microstructure, and parameter a as the ratio of the pressure drop vs. soot load slope of an asymmetric design filter as disclosed herein to the clean pressure drop of a symmetric filter having similar CPSI, wall thickness, diameter, length and wall microstructure. For the asymmetric design disclosed herein having outlet to inlet cross-sectional area ratio of 2:1, parameters $\Omega$ and $\sigma$ were calculated to be 0.597 and 0.84 respectively. For the asymmetric design disclosed herein having outlet to inlet cross-sectional area ratio of 2:1, parameters $\Omega$ and $\sigma$ were calculated to be 0.716 and 0.98 respectively. In some embodiments, the asymmetric design filters disclosed herein have $\Omega$ less than 0.85 and $\sigma$ less than 1. In other embodiments, the asymmetric design filters disclosed herein have $\Omega$ less than 0.75 and $\sigma$ less than 1. In still other embodiments, the asymmetric design filters disclosed herein have $\Omega$ less than 0.65 and $\sigma$ less than 1. In yet other embodiments, the asymmetric design filters disclosed herein have $\Omega$ less than 0.65 and $\sigma$ less than 0.9. In other embodiments, the asymmetric design filters disclosed herein have $\Omega$ less than 0.6 and $\sigma$ less than 0.85. FIG. 25 shows the modeled pressure drop performance of four different filter designs having diameter of 10.5 inches and length of 7.5 inches, (average) wall porosity of 55% and wall median pore diameter of 12 micrometers (microns). The pressure drop was modeled at soot loadings of 0 g/L and 6 g/L and therebetween for exhaust flow rate of 1250 m$^3$/hr and gas temperature of 200 C. For a design 25A for a filter body with known honeycomb structure as shown in FIGS. 1A and 1B and having cell density of 200 cells per square inch and honeycomb matrix wall thickness of 8 mils, the pressure drop increased from 1.197 kPa at 0 g/L soot load to 8.03 kPa at 6 g/L, corresponding to pressure drop vs. soot load slope of 1.139 kPa/(g/L of soot load). The bulk density for this example was about 296 g/L. For a design 25B for a filter body with an asymmetric honeycomb structure as shown in FIGS. 2A and 2B and having cell density of 300 cells per square inch and wall thickness of 7 mils, the pressure drop increased from 2.1 kPa at 0 g/L soot load to 5.71 kPa at 6 g/L, corresponding to pressure drop vs. soot load slope of 0.6 kPa/(g/L of soot load). The bulk density for this example was about 297 g/L. For a design 25C for a filter body with an asymmetric honeycomb structure as shown in FIGS. 2A and 2B and having cell density of 300 cells per square inch and wall thickness of 9 mils, the pressure drop increased from 2.43 kPa at 0 g/L soot load to 6.37 kPa at 6 g/L, corresponding to pressure drop vs. soot load slope of 0.66 kPa/(g/L of soot load). The bulk density for this example was about 361 g/L. For a design 25D as disclosed herein for a filter body with an asymmetric honeycomb structure as shown in FIGS. 5A and 5B (having inlet to outlet cross-section area of 2:1) and having cell density of 350 cells per square inch and wall thickness of 9.5 mils, the pressure drop increased from 1.46 kPa at 0 g/L soot load to 5.58 kPa at 6 g/L, corresponding to pressure drop vs. soot load slope of 0.686 kPa/(g/L of soot load). The bulk density for this example was about 412 g/L. For a design 25E as disclosed herein where the filter body has an asymmetric honeycomb structure as shown in FIGS. 10A and 10B (having outlet to inlet cross-section area of 3:1) and having cell density of 350 cells per square inch and wall thickness of 9.5 mils, the pressure drop increased from 1.76 kPa at 0 g/L soot load to 6.57 kPa at 6 g/L, corresponding to pressure drop vs. soot load slope of 0.801 kPa/(g/L of soot load). The bulk density for this example was about 412 g/L. In some embodiments, filters have higher bulk density and low clean and soot loaded pressure drop as higher bulk density can result in smaller temperature excursions during the regeneration of the filters. In some embodiments, the bulk density of filters disclosed herein can be 10% or more higher than that of a symmetric honeycomb filter (such as that shown in FIGS. 1A and 1B) while having similar clean filter pressure drop (corresponding to soot loading of 0 g/L). In other embodiments, the bulk density of filters disclosed herein can be 20% or more higher than that of a symmetric honeycomb filter having similar clean filter pressure drop. In still other embodiments, the bulk density of filters disclosed herein is can be 30% or more higher than that of a symmetric honeycomb filter having similar clean filter pressure drop. In yet other embodiments, the bulk density of filters disclosed herein can be 20% or more higher than that of a symmetric honeycomb filter having a similar clean filter pressure drop.

In addition to the pressure drop advantage, various embodiments disclosed herein lend themselves to having a much lower cost of extrusion die manufacturing, for example as compared to known asymmetric designs, such as comparing similar cell density. For example, in various embodiments disclosed herein, much of the honeycomb structure 400-1600 is comprised of 'straight line walls' so that large portions of the extrusion dies, which are used to form honeycomb structures disclosed herein by extrusion, can be cut with less expensive wire EDM or cutting wheel (e.g., abrasive wheel slitting) rather than relying primarily or exclusively on plunge EDM, such as with graphite electrodes. Therefore the use of techniques such as plunge EDM, which can be relatively expensive and time consuming, can be minimized.

Figure 21A:
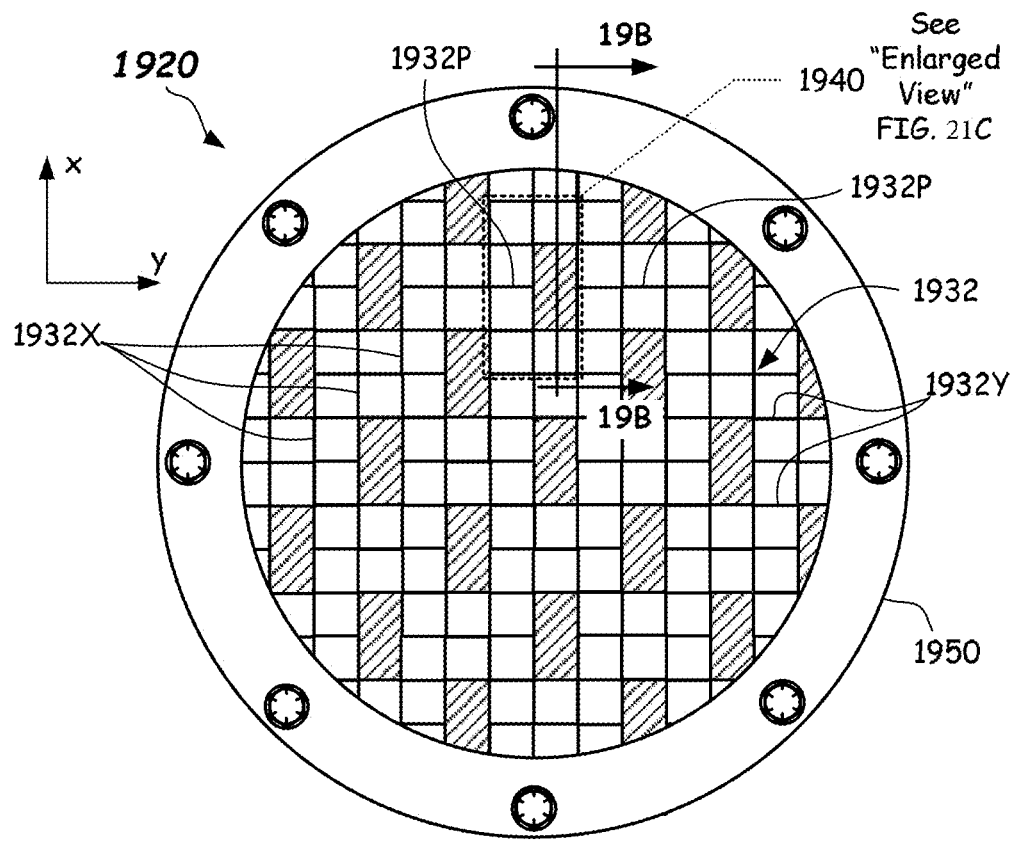
FIG. 21A illustrates a front end view of an example extrusion die configured to manufacture an embodiment of a particulate filter comprising the honeycomb structure of FIG. 11A according to one or more embodiments.
Figure 21B:
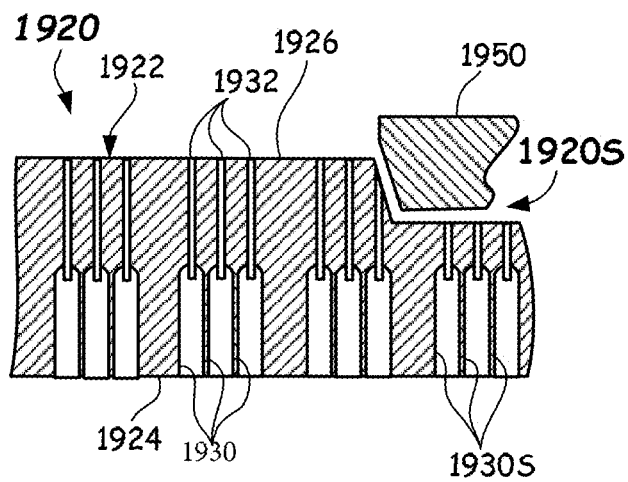
FIG. 21B illustrates a partial, cross-sectioned side view of an example of an extrusion die of FIG. 21A taken along section line 19B-19B according to one or more embodiments.
Figure 21C:
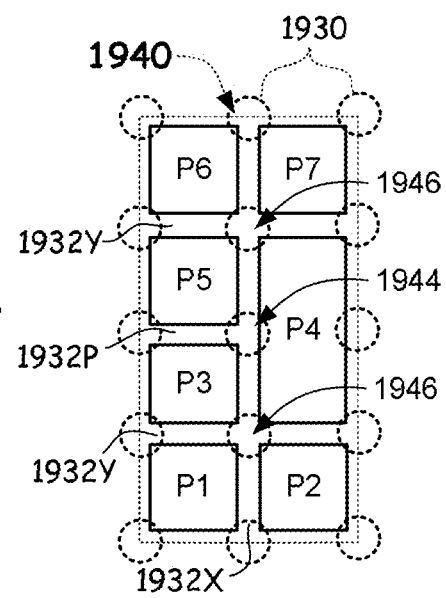
FIG. 21C illustrates an end view of an example of a die repeating unit of the extrusion die of FIG. 21A according to one or more embodiments.

For example, an embodiment of an extrusion die 1920 is disclosed in FIGS. 21A-21C. This example may be used to manufacture a green body by an extrusion process by extruding a batch mixture of inorganic and organic components and a liquid vehicle through the extrusion die 1920. The green body structure can be subsequently dried and fired to produce a honeycomb structure. The extrusion die 1920 that is shown is used to manufacture the honeycomb structure 1100 of FIG. 11, however, the general die structure disclosed herein is easily made applicable to the other honeycomb structures 400-1000, 1200-1600 described herein. Referring again to FIGS. 21A-21C, the honeycomb structures may be formed by extrusion of an extrudable batch mixture, which is described, for example, in any one of U.S. Pat. Nos. 3,885,977, 5,332,703, 6,391,813, 7,017, 278, 8,974,724, WO2014/046912, and WO2008/066765, through the extrusion die 1920 to produce a green body. In general, the green body comprises a substantially self-supporting structure formed from the extrudable mixture and is comprised of one or more ceramic-forming materials, or one or more ceramic materials, or both ceramic and ceramic-forming materials. The green body may then be dried and/or heated to dry, sinter, anneal, or otherwise fire the green body to form a structure comprising porous ceramic material. The green body may be dried such as described in U.S. Pat. Nos. 9,038,284, 9,335,093, 7,596,885, or 6,259,078, for example. The green body can be fired, such as described in any one of U.S. Pat. Nos. 9,452,578, 9,446,560, 9,005,517, 8,974, 724, 6,541,407, and 6,221,308 to form the honeycomb structure 400-1600 to comprise the geometry described herein. The honeycomb extrusion die 1920 comprises a die body 1922 (FIG. 21B), a die inlet face 1924 configured to receive the batch mixture, and a die outlet face 1926 opposite from the die inlet face 1924 configured to expel the plasticized batch in the form of a green body having a green honeycomb structure. The die body comprises a matrix of intersecting slots 1932 including a partial slot type 1932P and possibly one or more other slot types. The matrix of intersecting slots 1932 defines a die repeat unit 1940, i.e., a die structural unit that is repeated throughout the extrusion die 1920.

The honeycomb extrusion die 1920 comprises a plurality of feedholes 1930 (a few labeled) extending from the die inlet face 1924 into the die body 1922, and an intersecting with the matrix of intersecting slots 1932 (a few labeled) extending into the die body 1922 from the die outlet face 1926 and connecting with the plurality of feedholes 1930. The die may be incorporated into an extruder system such as a ram extruder or screw extruder such as a twin screw extruder which accepts batch mixture material to be extruded. The batch mixture is forced through a plurality of feedholes 1930 and into the matrix of intersecting slots 1932. The intersecting array of slots 1932 comprises at least slots of a partial slot type 1932P that extend less than entirely across the die outlet face 1926. In this embodiment, other slot types such as first slots 1932X (a few labeled) may be provided that may extend fully across the die outlet face 1926 (e.g., vertically as shown), and second slots 1932Y (orthogonal to the first slots 1932X) that may also extend fully across the die outlet face 1926 (e.g., horizontally as shown). The partial slots 1932P that do not extend fully across the die outlet face 1926, and in particular form a T-intersection, for example with the first slots 1932X, as shown. Together, the slots (e.g., slots 1932X, 1932Y, and/or 1932P) correspond to the array of die repeat units 1940 that are repeated across at least some of the die outlet face 1926. The die repeat units 1940 may be arranged, as shown for example, in a staggered side-by-side abutting relationship in the horizontal direction, and stacked one atop another in the vertical direction. A partial slot 1932P of the die repeat unit 1940 intersects, with a T-intersection, with one of the other slots, such as first slot 1932X.

The honeycomb extrusion die 1920 may comprise a skin-forming portion 1920 such as comprising a skin-forming mask 1950 (e.g., a mask ring) that interfaces with skin-forming feedholes 1930S to form an extruded skin on the honeycomb structure or matrix of the extruded green body honeycomb during the extrusion method. The mask ring may have a circular inner periphery shape as shown, but other shapes corresponding to other outer perimeter shapes of the extrudate or green body are possible as provided herein.

Die repeat unit 1940 comprises four or more die pins made up of a first die pin type and a second die pin type. The first die pin type is larger in cross-sectional area (in a plane orthogonal to the axial direction or extrusion direction z) than the second die pin type and comprises a rectangular shape in cross-section. The first die pin type comprises two first sides of length Lo and two second sides of width Wo, wherein Lo>Wo, and a partial slot 1932P terminating with a T-intersection on at least one of the first sides of length Lo. The second die pin type comprises a side length Li parallel to length Lo that is less than half the length of the first side of length Lo.

In the depicted embodiment, each of the die repeat units 1940 comprises die pins P1-P7. Each of the first slots 1932X and second slots 1932Y forming a part of the die pins (P1-P7) of the structure of the die repeat units 1940 may be formed, for example by wire EDM or by an abrasive cutting wheel process. The partial slots 1932P may be formed by a plunge EDM process, and even in this case, the EDM electrode has a simple rectangular shape in cross-section. Thus, the overall cost of the extrusion die can be dramatically reduced. In some embodiments, the partial slots 1932P may be started using an abrasive cutting wheel and then the ends of the partial slots at the T-intersection cleaned up using plunge EDM.

As can be seen in FIG. 21C, the die repeat units 1940 comprise a structure wherein some of the die pins of the second type (e.g., die pins P1-P3 and P5-P7) may comprise square shape in cross-section, and at least one die pin of the first type (e.g., die pin P4) comprises a rectangular shape in cross-section. The at least one die pin (e.g., die pin P4) comprising a rectangular shape in cross-section also comprises a relatively larger cross-sectional area than the pins of the second type (e.g., pins P1-P3 and P5-P7). In this depicted embodiment, the die repeat units 1940 have an outer peripheral shape that is rectangular. However, the die repeat units may comprise the outer perimeter shape of the repeating structural unit of the other honeycomb structures 400 and 600-1600 described herein.

Die repeat units 1940 comprises structure wherein the partial slot 1932P intersects with another slot adjacent to a long side of the first type (e.g., die pin P4 intersects with first slot 1932X) to form a junction that is a T-intersection 1944 rather than a cross intersection 1946 as is present at the intersection of the first and second slots 1932X and 1932Y.

The extrusion die 1920 may comprise different feedhole patterns (feedholes 1930 shown as dotted circles in FIG. 21C). For example, in a first embodiment the feedholes 1930 may be disposed at every intersection of the slots 1932X, 1932Y, 1932S. Other feedhole designs for feedhole locations may be used. Thus, for each die design adapted to manufacture the honeycomb structures 400-1600 described herein, the die repeat units comprise a structure wherein the partial slot 1932P intersects with one of the first slot 1932X and/or the second slot 1932Y at a T-intersection 1944 at the side of a pin of the first type (e.g., pin P4) corresponding to an outlet cell 402-1602 in the honeycomb structure 400-1600 produced after drying and firing the extruded green body. As such, the partial slot 1932P terminates at the relatively large pin configured to form an outlet cell, i.e., at the pin that comprises a relatively larger cross-sectional area as compared to at least some of the other pins. In some embodiments, the die repeat unit comprises a rectangular outer perimeter shape (See FIGS. 5A-5B, FIGS. 7A-7B, FIGS. 8A-8B, FIG. 10A through FIG. 13B, and FIGS. 16A-16B. In other embodiments, the outer periphery shape may include more than four sides.

In some embodiments disclosed herein, one or more strengthening features can be incorporated into the honeycomb structure. For example, as is shown in FIGS. 22A and 22B, one or more cell walls within the matrix of interconnected porous walls can be provided with an increased cell wall thickness (shown via a thicker line) compared to nearby or surrounding cell walls. Thickness may be 20% greater or more, for example. In some of these embodiments, the thicker cell wall thickness, or web thickness, can be increased on those cell walls 2003Y that extend continuously across a plurality of cells (e.g., in they direction), or even across the entire honeycomb structure of the honeycomb body. In other embodiments, the wall thickness of walls 2003X that extend in the x direction can be made thicker, such as shown in FIG. 22C. Combinations of thicker walls in the x and y directions can be provided in some embodiments (See FIG. 22C), especially for those walls that extend across multiple repeating structural units 2000U', and even across the entire the honeycomb structure 2000U' of the honeycomb body.

FIG. 23 illustrates a flow chart of method of manufacturing a honeycomb structure (e.g., honeycomb structures 400-1600 and 2000, 2000'). The method 2100 comprises extruding (2102) a ceramic or ceramic-forming batch mixture through an extrusion die to form a self-standing green ware, drying (2104) the green ware, and firing (2106) the green ware to form a porous ceramic article. The extrusion die (e.g., extrusion die 1920) can comprise an outlet face (e.g., outlet face 1926) of a die body (die body 1922) comprising a matrix of pins defining intersecting slots (e.g., slots 1932) including a partial slot type (e.g., slot type 1932P, the matrix defining a die repeat unit (e.g., die repeat unit 1940), wherein the partial slot type extends less than entirely across the outlet face. For example, the die repeat unit can include four or more die pins (e.g., die pins P1-P7) made up of a first die pin type and a second die pin type. The first die pin type is larger in cross-sectional area than the second die pin type and includes a rectangular shape in cross-section with two first sides of length Lo and two second sides of width Wo, wherein Lo>Wo, and includes a slot of the partial slot type terminating with a T-intersection (e.g., T-intersection 1944) on at least one of the first sides.

The second die pin type can comprise a side length Li that is less than half the length of the first side of length Lo. The second die pin type (e.g., P1-P3 and P5-P7) may be square in cross-section in a plane orthogonal to the extrusion direction. The method 2100 can comprise extruding a batch mixture through such matrix of intersecting slots to form a green body. The green body comprises a honeycomb structure which is largely the geometrical structure of the final fired honeycomb article, although typically the green ware is subject to shrinkage upon firing into the final ceramic article. Thus, in some embodiments, The method 2100 comprises firing the green body to form a ceramic bodies comprising a honeycomb structure (e.g., honeycomb structures 400-1600 and 2000, 2000'). The honeycomb structure comprises a matrix of intersecting porous cell walls (e.g., cell walls 403-2003, 2003') extending axially between an inlet end and an outlet end of the honeycomb structure, the matrix defining a plurality of inlet cells (e.g., inlet cells 401-2001) and outlet cells (e.g., outlet cells 402-2002), and corresponding inlet channels and outlet channels defined by respective inlet cells and respective outlet cells, wherein at least a portion of the outlet channels are larger in cross-sectional area than any of the inlet channels, and at least some of the outlet channels comprise a rectangular shape in cross-section.

It will be apparent to those skilled in the art that various modifications and variations can be made to the embodiments described herein without departing from the scope of the claimed subject matter. Thus it is intended that the specification cover the modifications and variations of the various embodiments described herein provided such modification and variations come within the scope of the appended claims and their equivalents.

What is claimed is:

1. A particulate filter comprising: a honeycomb structure comprising a matrix of intersecting porous cell walls extending in an axial direction between an inlet end and an outlet end of the honeycomb structure, the matrix defining a plurality of inlet cells and outlet cells, and corresponding inlet channels and outlet channels defined by respective inlet cells and respective outlet cells, wherein at least a portion of the outlet channels are larger in cross-sectional area than any of the inlet channels, and at least some of the outlet channels comprise a rectangular shape in cross-section, wherein either (a) some of the outlet channels have cross-sectional area greater than or equal to twice the cross-sectional area of an inlet channel, or (b) the rectangular shape comprises an outlet length Lo that is more than twice an inlet length Li across an inlet channel in a plane perpendicular to the axial direction;

wherein there are 3 or more times as many inlet channels as outlet channels.

2. The filter of claim 1 wherein the matrix comprises a plurality of repeating structural units, each unit comprising a group of walls defining a respective outlet channel and a plurality of surrounding or abutting inlet channels adjacent the respective outlet channel.

3. The filter of claim 2 wherein each repeating structural unit comprises walls extending in an axial direction (z-direction), the walls comprised of a first group of side walls aligned parallel to a first direction and a second group of side walls aligned parallel to a second direction, wherein the first direction is orthogonal to the second direction, and the first and second directions are each orthogonal to the axial direction.

4. The filter of claim 3 wherein each repeating structural unit comprises:
an outlet-defining set of walls comprised of a first set of the walls of the first group interconnected with a second set of the walls of the second group to collectively define a corresponding outlet cell in the repeating structural unit, the outlet cell having a plurality of corners, and at least one wall, other than the outlet-defining set of walls, which interconnects with a T-intersection with one of the outlet-defining set of walls at an intermediate location between corners of the corresponding outlet cell.

5. The filter of claim 3 wherein the repeating structural unit comprises a plurality of inlet cells.

6. The filter of claim 3 wherein the repeating structural unit comprises a plurality of outlet cells.

7. The filter of claim 6 wherein the repeating structural unit comprises at least two outlet cells having differing cross-sectional areas.

8. The filter of claim 3 wherein a sidewall of the first group interconnects with a sidewall of the second group.

9. The filter of claim 3 wherein sidewalls of the first group interconnects with a sidewall of the second group.

10. The filter of claim 3 wherein each repeating structural unit comprises:
an outlet-defining set of walls comprised of a first set of the walls of the first group interconnected with a second set of the walls of the second group to collectively define a corresponding outlet cell in the repeating structural unit, the outlet cell having a plurality of corners, and
at least one wall, other than the outlet-defining set of walls, which interconnects with a T-intersection with one of the outlet-defining set of walls at a location spaced away from the corners of the corresponding outlet cell.

11. The filter of claim 6 wherein at least one of the inlet cells shares one of the outlet-defining set of walls with an outlet cell.

12. The filter of claim 6 wherein each of a plurality of the inlet cells shares one of the outlet-defining set of walls with an outlet cell.

13. The filter of claim 1 wherein there are between 3 and 10 times as many inlet channels as outlet channels.

14. The filter of claim 1 wherein some of the outlet channels have cross-sectional area equal to a cross-sectional area of an inlet channel.

15. The filter of claim 1 wherein some of the outlet channels have cross-sectional area greater than or equal to twice the cross-sectional area of an inlet channel.

16. The filter of claim 1 wherein the rectangular shape comprises an outlet length Lo that is more than twice an inlet length Li across an inlet channel in a plane perpendicular to the axial direction.

* * * * *